US012764237B2

(12) United States Patent
Ishikawa et al.

(10) Patent No.: US 12,764,237 B2
(45) Date of Patent: Oct. 13, 2026

(54) PRINTED MATERIAL INSPECTION SYSTEM AND NON-TRANSITORY COMPUTER READABLE MEDIUM

(71) Applicant: FUJIFILM BUSINESS INNOVATION CORP., Tokyo (JP)

(72) Inventors: Shogo Ishikawa, Kanagawa (JP); Takashi Kikumoto, Kanagawa (JP); Yoshie Ohira, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/300,816

(22) Filed: Apr. 14, 2023

(65) Prior Publication Data

US 2024/0163376 A1 May 16, 2024

(30) Foreign Application Priority Data

Nov. 11, 2022 (JP) ................................ 2022-181274

(51) Int. Cl.
*H04N 1/00* (2006.01)
*B41J 29/46* (2006.01)

(52) U.S. Cl.
CPC ..... *H04N 1/00037* (2013.01); *H04N 1/00005* (2013.01); *H04N 1/00082* (2013.01); *B41J 29/46* (2013.01)

(58) Field of Classification Search
CPC ........... H04N 1/00037; H04N 1/00005; H04N 1/00082; H04N 1/00029; H04N 1/0044;
(Continued)

(56) References Cited

U.S. PATENT DOCUMENTS

2014/0079293 A1 3/2014 Kitai et al.
2020/0051231 A1 2/2020 Tsukamoto
(Continued)

FOREIGN PATENT DOCUMENTS

JP 2020-082421 A 6/2020
JP 2020-205567 A 12/2020

OTHER PUBLICATIONS

Sep. 14, 2023 Extended European Search Report issued in European Patent Application No. 23168105.7.
(Continued)

*Primary Examiner* — John R Wallace
(74) *Attorney, Agent, or Firm* — Oliff PLC

(57) ABSTRACT

A printed material inspection system includes a display and a processor configured to: acquire, as a defect corresponding to a defect criterion, a difference that satisfies the defect criterion among differences between a scanned image obtained by scanning a printed material of an inspection target page among pages configuring a job and a reference image of the inspection target page; highlight the defect in the scanned image on the display and provide defect criterion display that is display for receiving setting for a defect criterion to be applied to the inspection target page on the display; and when a user operation for one of the highlighting of the defect and the providing of the defect criterion display is received, change a display mode of another one of the highlighting of the defect and the providing of the defect criterion display.

20 Claims, 20 Drawing Sheets

(58) Field of Classification Search
CPC ...... H04N 1/00962; B41J 29/46; G06T 7/001; G01N 21/95
See application file for complete search history.

(56) References Cited

U.S. PATENT DOCUMENTS

| | | | | |
|---|---|---|---|---|
| 2021/0042065 A1* | 2/2021 | Yamamoto | G06F 3/121 | |
| 2022/0318976 A1* | 10/2022 | Ochiai | G06T 7/001 | |
| 2023/0281799 A1* | 9/2023 | Yamashita | H04N 1/00068 | 382/112 |

OTHER PUBLICATIONS

Jul. 28, 2026 Office Action issued in Japanese Patent Application No. 2022-181274.

* cited by examiner

PRINTED MATERIAL INSPECTION SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-181274 filed Nov. 11, 2022.

BACKGROUND

(i) Technical Field

The present disclosure relates to a printed material inspection system and a non-transitory computer readable medium.

(ii) Related Art

In Japanese Unexamined Patent Application Publication No. 2020-082421, an image inspection report creation apparatus that displays only a defect recognized as necessary to be understood by a user in a result report, is described. The image inspection report creation apparatus includes an inspection image generation unit that generates an inspection image to inspect a read image read by an image reading unit, a difference level calculation unit that calculates, based on a difference between the inspection image and the read image, a difference level indicating the degree of the difference, a display determination unit that compares the difference level calculated by the difference level calculation unit with a preset reference difference level and determines whether or not to display the difference in a result report, and a file creation unit that creates, based on a result of the determination by the display determination unit, a result report regarding the difference.

In Japanese Unexamined Patent Application Publication No. 2020-205567, an image processing apparatus that is capable of appropriately reusing a non-defective item and excluding a defective item even in the case where re-determination is performed for a discharged printed material in accordance with changed conditions based on which an image abnormality is to be detected, is described. The image processing apparatus includes a printing unit that outputs a printed material, a reading unit that reads the printed material and acquires a read image, a determination unit that analyzes the read image to detect an image abnormality and determines whether or not the printed material is defective, a paper discharge unit that sorts printed materials into non-defective items and defective items based on results of the determination and discharges the sorted printed materials, and a reporting unit that displays a result of the detection of image abnormality on a display unit and receives a change of a detection threshold for image abnormality and/or a change of a detection item. When the detection threshold for image abnormality is changed and/or there is a change of a detection item, the determination unit performs re-determination for a discharged printed material. The reporting unit reports an output position of a printed material for which the determination as to whether or not the printed material is defective is changed.

SUMMARY

Aspects of non-limiting embodiments of the present disclosure relate to providing a printed material inspection system that requires less time and effort to set a defect criterion compared to a printed material inspection system that does not display a scanned image obtained by scanning a printed material of an inspection target page at the time of setting a defect criterion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printed material inspection system including a display and a processor configured to: acquire, as a defect corresponding to a defect criterion, a difference that satisfies the defect criterion among differences between a scanned image obtained by scanning a printed material of an inspection target page among pages configuring a job and a reference image of the inspection target page; highlight the defect in the scanned image on the display and provide defect criterion display that is display for receiving setting for a defect criterion to be applied to the inspection target page on the display; and when a user operation for one of the highlighting of the defect and the providing of the defect criterion display is received, change a display mode of another one of the highlighting of the defect and the providing of the defect criterion display.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be described with reference to drawings.

Figure 1:
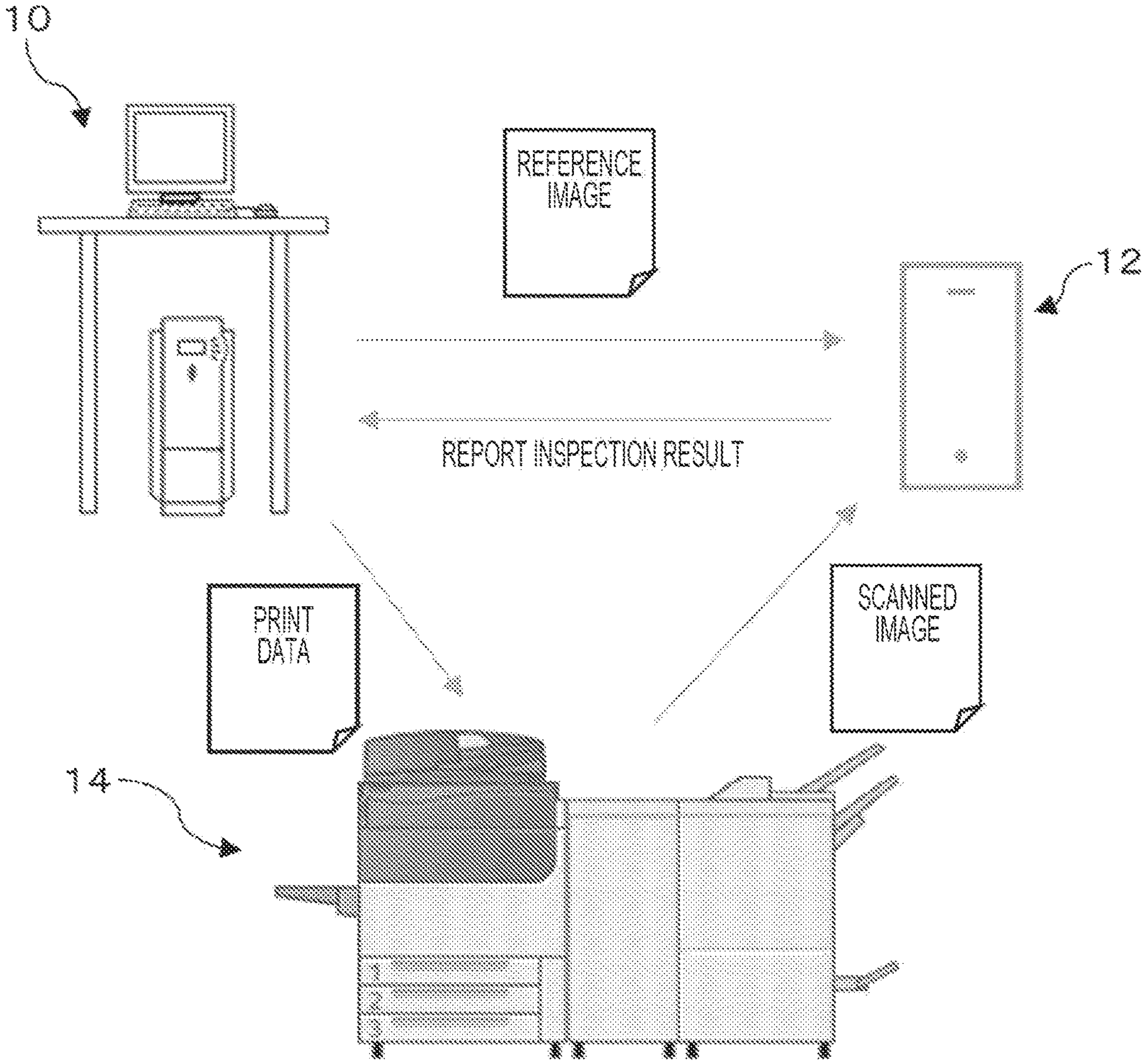
FIG. 1 is a system configuration diagram of a printed material inspection system according to an exemplary embodiment.

FIG. 1 is a system configuration diagram of a printed material inspection system according to an exemplary embodiment. The printed material inspection system includes a print server 10, a printed material inspection apparatus 12, and a printer 14. The print server 10, the printed material inspection apparatus 12, and the printer 14 are connected through a communication line in such a manner that data are able to be transferred among the print server 10, the printed material inspection apparatus 12, and the printer 14. The communication line may be wired or wireless and may be a public line or a dedicated line. The communication line may be, for example, a local area network (LAN). However, the communication line is not necessarily a LAN.

The print server 10 supplies print data of a print job to the printer 14. The print server 10 also generates, in addition to the print data, reference image data from a rasterization result of the print job, and supplies the reference image data to the printed material inspection apparatus 12. Rasterization processing is publicly known. The rasterization processing is processing for generating raster data (image data) by performing rendering processing based on data in an intermediate format.

The printer 14 receives print data from the print server 10 and performs printing based on the print data on paper. A printed material is discharged through a discharge tray of the printer 14. The printer 14 includes a built-in scanner. The printer 14 generates scanned image data by scanning a printed material using the built-in scanner and supplies the scanned image data to the printed material inspection apparatus 12.

The configuration of the printer 14 is publicly known, but it will be briefly described below. The printer 14 prints, based on a job (print job) acquired from the print server 10, images on a printing medium such as paper. A print job is a processing unit of printing operation directed in a single printing instruction.

The printer 14 includes a storage unit, a transport unit, a printing unit, a discharge unit, and a controller. The storage unit has a function for storing paper to be supplied to the printing unit and includes a storage tray in which paper is stacked.

The transport unit has a function for transporting paper stored in the storage unit to the printing unit. The transport unit includes, for example, a sending roller for sending paper out of the storage unit and pairs of transport rollers arranged along a transport path from the storage unit to the printing unit.

The printing unit has a function for printing images on paper. For example, the printing unit prints images on paper using an electrophotographic system. That is, the printing unit prints images on paper by going through processes including charging, exposure, development, transfer, and fixing. The printing unit may also have a function for printing images on both sides of paper by flipping the paper over and transporting the flipped paper.

The discharge unit is a part to which printed paper is discharged. For example, the discharge unit includes a plurality of sections that are arranged vertically. Paper is discharged to a section specified in a print job.

The controller controls operations of individual units of the printer 14. In this exemplary embodiment, the controller controls an operation of the built-in scanner. The controller turns on the operation of the built-in scanner for a page set as an inspection target among all the pages of a job and generates scanned image data by scanning a printed material printed by the printing unit. Furthermore, the controller turns off the operation of the built-in scanner for a page set as a non-inspection target among all the pages of a job and does not generate scanned image data. The controller acquires information regarding whether or not a page is an inspection target from a user terminal operated by a user or from the print server 10. The information regarding whether or not a page is an inspection target may be acquired from the printed material inspection apparatus 12.

The printed material inspection apparatus 12 acquires defects by acquiring reference image data from the print server 10 and scanned image data from the printer 14 and comparing the reference image data with the scanned image data for a page set as an inspection target among all the pages of a print job. The printed material inspection apparatus 12 notifies the user of an inspection result by displaying the inspection result on the display device.

Figure 2:
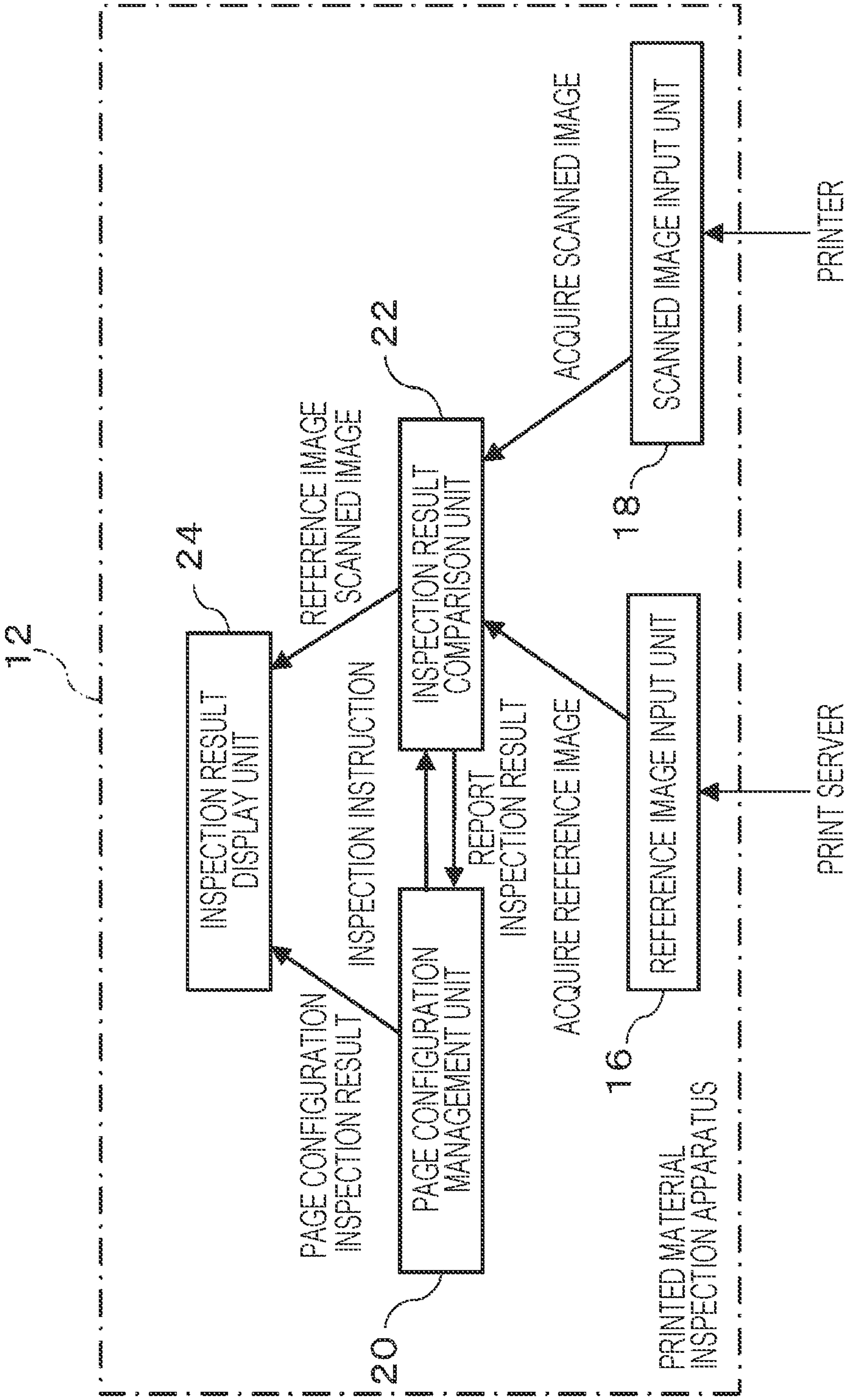
FIG. 2 is a functional block diagram of a printed material inspection system according to an exemplary embodiment.

FIG. 2 is a functional block diagram of the printed material inspection apparatus 12. The printed material inspection apparatus 12 includes, as functional blocks, a reference image input unit 16, a scanned image input unit 18, a page configuration management unit 20, an inspection result comparison unit 22, and an inspection result display unit 24.

The reference image input unit 16 inputs reference image data created by the print server 10. The reference image input unit 16 may generate reference image data based on job data from the print server 10, that is, reference image data based on a rasterization result of a job. The reference image data may be generated by the print server 10 or the printed material inspection apparatus 12.

The scanned image input unit 18 inputs scanned image data obtained by scanning using the built-in scanner of the printer 14.

The page configuration management unit 20 manages information about individual pages of a job, information regarding whether or not each page is an inspection target, and a result of inspection of each page that is determined to be an inspection target.

The inspection result comparison unit 22 compares a reference image with a scanned image for each page and determines whether or not a result of printing by the printer 14 has a defect. Defects in a printing result includes printing stains, printing failures, and the like. The inspection result comparison unit 22 notifies the page configuration management unit 20 of an inspection result and supplies reference image data and scanned image data to the inspection result display unit 24. More particularly, the inspection result comparison unit 22 compares a scanned image with a reference image for an inspection target page and acquires a difference that satisfies a defect criterion, among differences between the images, as a defect corresponding to the defect criterion. Then, the inspection result comparison unit 22 notifies the page configuration management unit 20 of an inspection result and supplies scanned image data and corresponding defect criterion data to the inspection result display unit 24. The defect criterion represents a criterion used to determine whether or not to regard a detected difference as a defect. The criterion relates to, for example, the size of a detected difference, a threshold for a color difference from an adjacent pixel, a shape, and the like.

The inspection result display unit 24 receives data from the page configuration management unit 20, that is, page configuration data and inspection result data, and outputs and displays an inspection result based on the data mentioned above. Specifically, the inspection result display unit 24 displays, based on page configuration data of a job, a scanned image of each page. Then, in the case where an inspection result indicates a printing defect, the inspection result display unit 24 highlights a region in the scanned image in which the defect is detected. Highlighting is, for example, indicating a region in which a defect is detected using an arrow, indicating a region in which a defect is detected using a specific color, enclosing a region in which a defect is detected in a specific shape or using a specific type of line. However, the way of highlighting is not particularly limited. Furthermore, the inspection result display unit 24 displays a scanned image and a defect criterion used for the scanned image, at the same time. Displaying a scanned image and a corresponding defect criterion at the same time will be described further in detail later.

Figure 3:
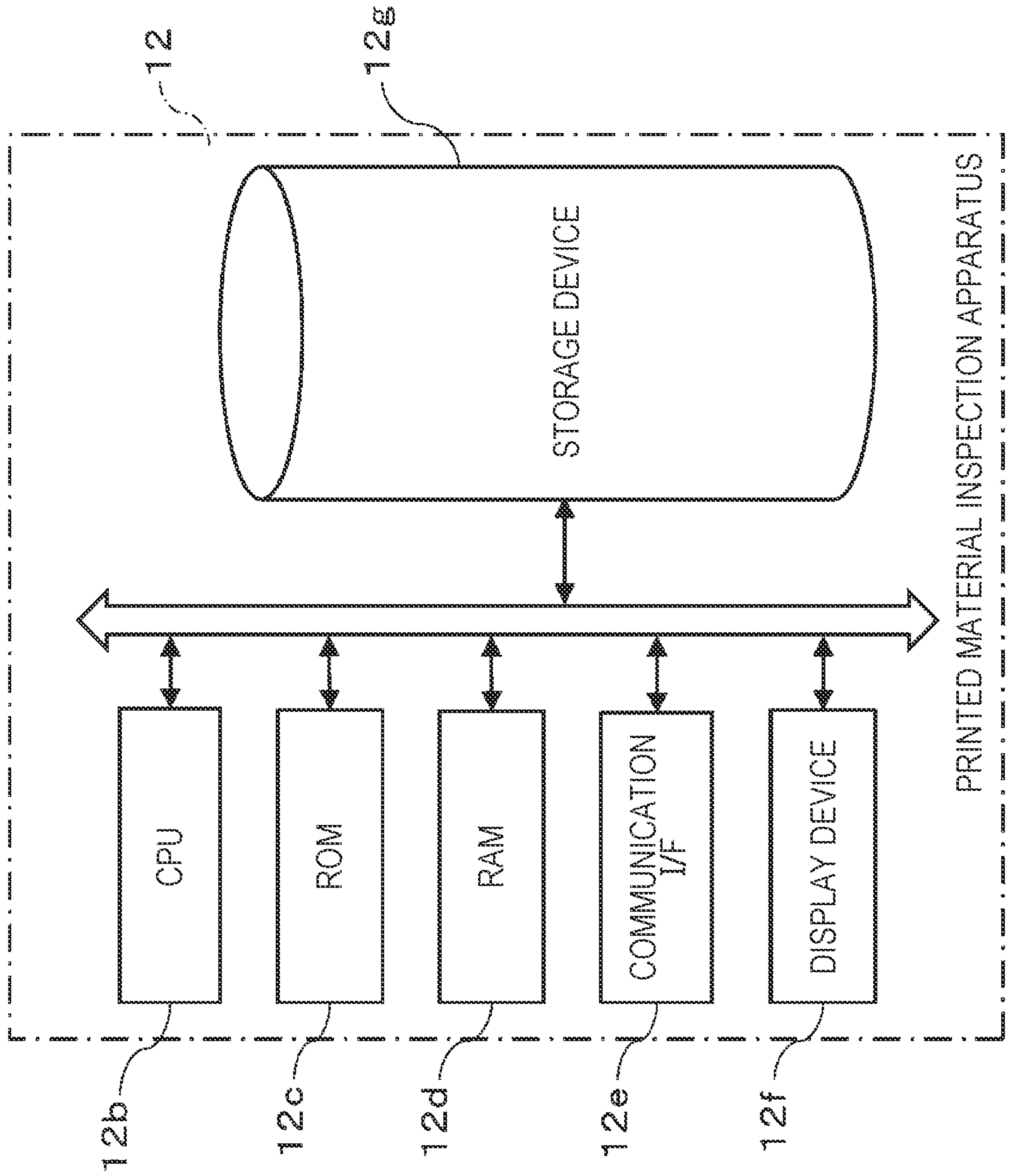
FIG. 3 is a configuration block diagram of a printed material inspection system according to an exemplary embodiment.

FIG. 3 is a configuration block diagram of the printed material inspection apparatus 12. The printed material inspection apparatus 12 includes one or a plurality of computers. The printed material inspection apparatus 12 includes one or a plurality of central processing units (CPUs) 12*b*, a read only memory (ROM) 12*c*, a random access memory (RAM) 12*d*, a communication interface (UF) 12*e*, a display device 12*f*, and a storage device 12*g*.

The one or the plurality of CPUs 12*b* each implement various functions by reading a program stored in the ROM 12*c* or the storage device 12*g* and using the RAM 12*d* as a working memory. The CPU 12*b* implements the page configuration management unit 20 and the inspection result comparison unit 22 illustrated in FIG. 2.

The communication OF 12*e* receives reference image data supplied from the print server 10 and receives scanned image data supplied from the printer 14. The communication OF 12*e* outputs the received reference image data and scanned image data to the CPU 12*b*.

The display device 12*f* includes a cathode ray tube (CRT), liquid crystal, or organic electroluminescence (EL) display. The display device 12*f* displays a page configuration inspection result from the CPU 12*b* and displays a scanned image and a defect criterion. The display device 12*f* implements the inspection result display unit 24 illustrated in FIG. 2.

The storage device 12*g* includes a nonvolatile memory such as a hard disk drive (HDD) or a solid state drive (SSD). The storage device 12*g* stores a program and various image data.

As a basic operation, the printed material inspection apparatus 12 according to this exemplary embodiment inspects whether or not there is a defect such as a printing stain in a printed material by comparing a reference image from the print server 10, that is, a reference image serving as a reference for an inspection created from a rasterization result of a job, with a scanned image obtained by scanning, using the built-in scanner, the printed material printed by the printer 14, and displays a result of the inspection and a defect criterion used for the inspection.

All the pages of a job output from the printer 14 are not necessarily inspection targets. In the cases described below, there is a page that is not determined to be an inspection target.

(1) Case where a Printing Target Page is Determined to be a Non-Inspection Target by a User False detection may occur when a preprint image that is not present in a reference image is recorded in a scanned image for a page using preprint paper. Furthermore, false detection may occur when a paper pattern is recorded in a scanned image for a page using paper such as embossed paper to which a paper pattern is intentionally provided. Furthermore, the user may intentionally exclude a page from an inspection target in terms of job configuration.

(2) Case where a Blank Page on which Printing is not Performed is Inserted Due to Job Configuration A blank page for sorting on which printing is not performed may be inserted for separation between copies of a job. Furthermore, a recovery sheet may be inserted at the time of occurrence of paper jam. Moreover, in double-sided printing, in the case where the number of pages is odd, the rear face of a sheet may be blank.

In contrast, for a page determined to be an inspection target, an inspection of whether or not there is a defect such as a printing stain in a printed material is performed by comparing a reference image from the print server 10, that is, a reference image serving as a reference for an inspection created from a rasterization result of a job, with a scanned image obtained by scanning, using the built-in scanner, a printed material printed by the printer 14, and a result of the inspection is displayed, as described above. In this case, it is desirable that a plurality of defect criteria to be used for determining whether or not there is a defect for each job be set in advance so that a user is able to set a desired defect criterion in accordance with a job. This is because a required defect criterion may be different according to a job, the type of a printed material, or a purpose. For example, a printed material does not require a strict defect criterion, whereas another printed material requires a strict defect criterion.

However, depending on a set defect criterion, a minute difference that is unable to be recognized by human eyes may be determined to be a defect. This may lead to a complicated inspection result or a printed material may be unnecessarily processed as a defective printed material and may need to be printed again. Thus, it is desirable that a defect criterion used in an inspection system have the degree of accuracy close to the degree that is recognizable by human eyes.

Figure 4:
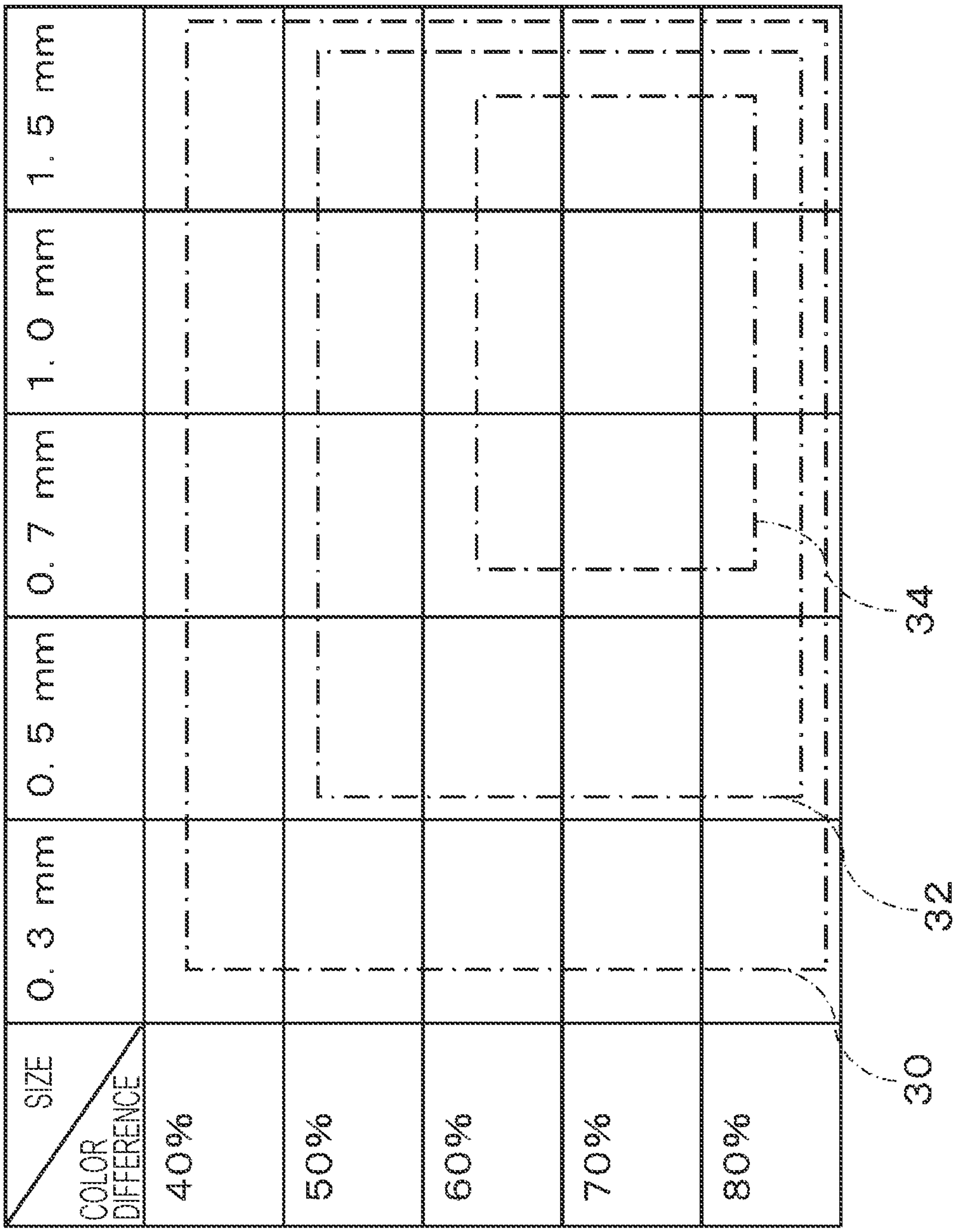
FIG. 4 is a schematic diagram of defect criteria of combinations of color difference and size in an exemplary embodiment.

FIG. 4 illustrates an example of defect criteria used in defect inspections of printed materials by the CPU 12*b*. The user sets an appropriate defect criterion by setting, at the time of setting a print job, a defect criterion setting file including information of a defect criterion for each job or each page. Alternatively, the system may set a defect criterion setting file in advance. Information regarding a defect in a printed material includes x coordinate, y coordinate, color difference, size, and the like. In this example, a combination of color difference and size is used as a defect criterion. A defect criterion setting file regarding a combination of color difference and size is created in advance. The number of defect criterion setting files may be set in a desired manner. For example, three defect criterion setting files: High, Standard, and Low, are created. The three defect criterion setting files for High, Standard, and Low have different threshold ranges. In the case of the High defect criterion setting file, even small differences in color difference and size are acquired as a defect. In the case of the Low defect criterion setting file, only big differences in color difference and size are acquired as a defect. At the time of setting a print job, the user sets a defect criterion by selecting an appropriate file for each job or each page from among the three defect criterion setting files.

Referring to FIG. 4, for combinations of five color difference levels: "40%≤color difference<50%", "50%≤color difference<60%", "60%≤color difference<70%", "70%≤color difference<80%", and "80%≤color difference", and five size levels: "0.3 mm≤size<0.5 mm", "0.5 mm≤size<0.7 mm", "0.7 mm≤size<1.0 mm", "1.0 mm≤size<1.5 mm", and "1.5 mm≤size", a High defect criterion 30, a Standard defect criterion 32, and a Low defect criterion 34 are set. For example, a difference of (color difference, size)=(40%, 0.3 mm) is acquired as a defect according to the High defect criterion 30 but is not acquired as a defect according to the Standard defect criterion 32 and the Low defect criterion 34. Furthermore, a difference of (color difference, size)=(80%, 1.5 mm) is acquired as a defect according to all the High defect criterion 30, the Standard defect criterion 32, and the Low defect criterion 34.

Figure 5:
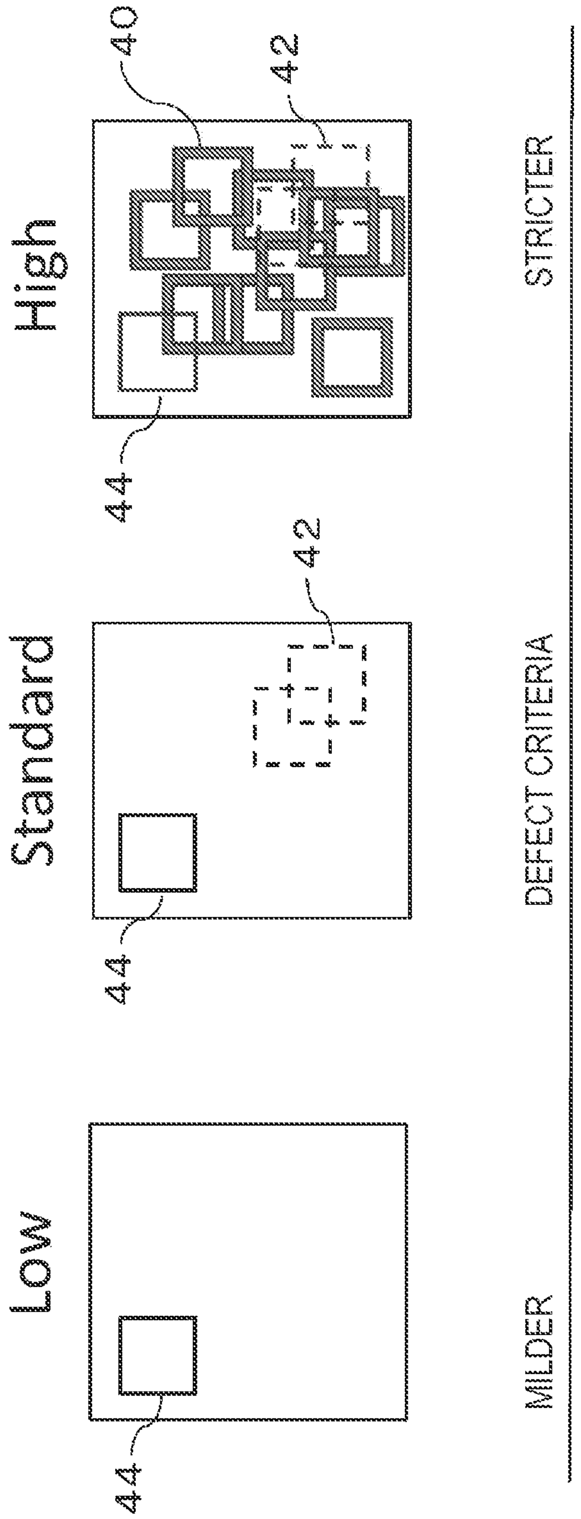
FIG. 5 is a schematic diagram illustrating the relationship between defect criteria and detected defects in an exemplary embodiment.

FIG. 5 schematically illustrates results of inspections according to defect criteria based on the three defect criterion setting files illustrated in FIG. 4, that is, the High defect criterion 30, the Standard defect criterion 32, and the Low defect criterion 34. In FIG. 5, positions at which defects are acquired are indicated as rectangular regions.

The higher the defect criterion (the stricter the condition), the larger the number of defects acquired. In contrast, the milder the defect criterion (the milder the condition), the smaller the number of defects acquired. According to the High defect criterion 30, many defects 40, 42, and 44 are acquired. According to the Standard defect criterion 32, the defects 40 that are acquired according to the High defect criterion 30 are not acquired and only the defects 42 and 44 are acquired. According to the Low defect criterion 34, the defects 42 that are acquired according to the Standard defect criterion 32 are also not acquired and only the defect 44 is acquired.

In the case where the defect criterion setting file set in advance is High or in the case where High is set by the user, the CPU 12*b* acquires the defects 40, 42, and 44 and displays the acquired defects 40, 42, and 44 on the display device 12*f*. However, as illustrated in FIG. 5, because the many defects 40, 42, and 44 are acquired and displayed in a complicated manner in the case of the High defect criterion setting file, defects that need to be correctly checked by visual inspection, for example, the defects 42, may be overlooked due to presence of the defects 40. In particular, as illustrated in FIG. 5, in the case where the many defects 40 are present around the defects 42 or the many defects 40 overlap with the defects 42, the defects 42 are highly likely to be overlooked.

In such a case, by changing the defect criterion setting file from High to Standard, the defects 40 are not acquired, and the presence of the defects 42, which need to be correctly checked by visual inspection, becomes clearer.

Thus, even in the case where the defect criterion setting file set in advance is High or in the case where High is set by the user, concurrently with the inspection based on the High defect criterion or subsequently to the inspection based on the High defect criterion, the CPU 12*b* automatically performs an inspection based on the Standard defect criterion setting file, stores a result of the inspection into the storage device 12*g* or the RAM 12*d*, and rapidly displays the detection result on the display device 12*f* in accordance with an operation by the user for changing the defect criterion setting file. In other words, the CPU 12*b* automatically, at the background, performs an inspection based on a defect criterion different from a set defect criterion, holds a result of the automatic inspection, and displays the result of the automatic inspection in accordance with a change operation performed by the user.

Furthermore, in the case where the defect criterion setting file set in advance is High or in the case where High is set by the user, concurrently with the inspection based on the High defect criterion or subsequently to the inspection based on the High defect criterion, the CPU 12*b* may automatically perform an inspection based on the Standard defect criterion setting file and an inspection based on the Low defect criterion setting file and store results of the inspections into the storage device 12*g* or the RAM 12*d*. This is because the user may perform an operation for changing the setting from High to Standard and then from Standard to Low.

There may be some methods in which the CPU 12*b* compares a scanned image with a reference image, acquires a defect, and displays the acquired defect. Specifically, there are method A: detecting in advance all the detectable differences and method B: acquiring defects every time a defect criterion changes.

Specifically, the method A includes step A-1 for detecting all the detectable differences, step A-2 for acquiring a set defect criterion, and step A-3 for acquiring only a defect corresponding to the defect criterion acquired in step A-2 from among all the differences detected in step A-1 and displaying the acquired defect.

Specifically, the method B includes step B-1 for acquiring a set defect criterion and step B-2 for acquiring only a defect corresponding to the defect criterion acquired in step B-1 and displaying the acquired defect.

In either of the methods described above, a defect corresponding to a set defect criterion is acquired and displayed. Thus, it is desirable that the user be able to easily recognize on a screen a defect criterion corresponding to the displayed defect. To this end, the CPU 12*b* notifies the user of the position of the acquired defect by displaying the acquired defect superimposed on a scanned image and displays a defect criterion corresponding to the defect.

Figure 6:
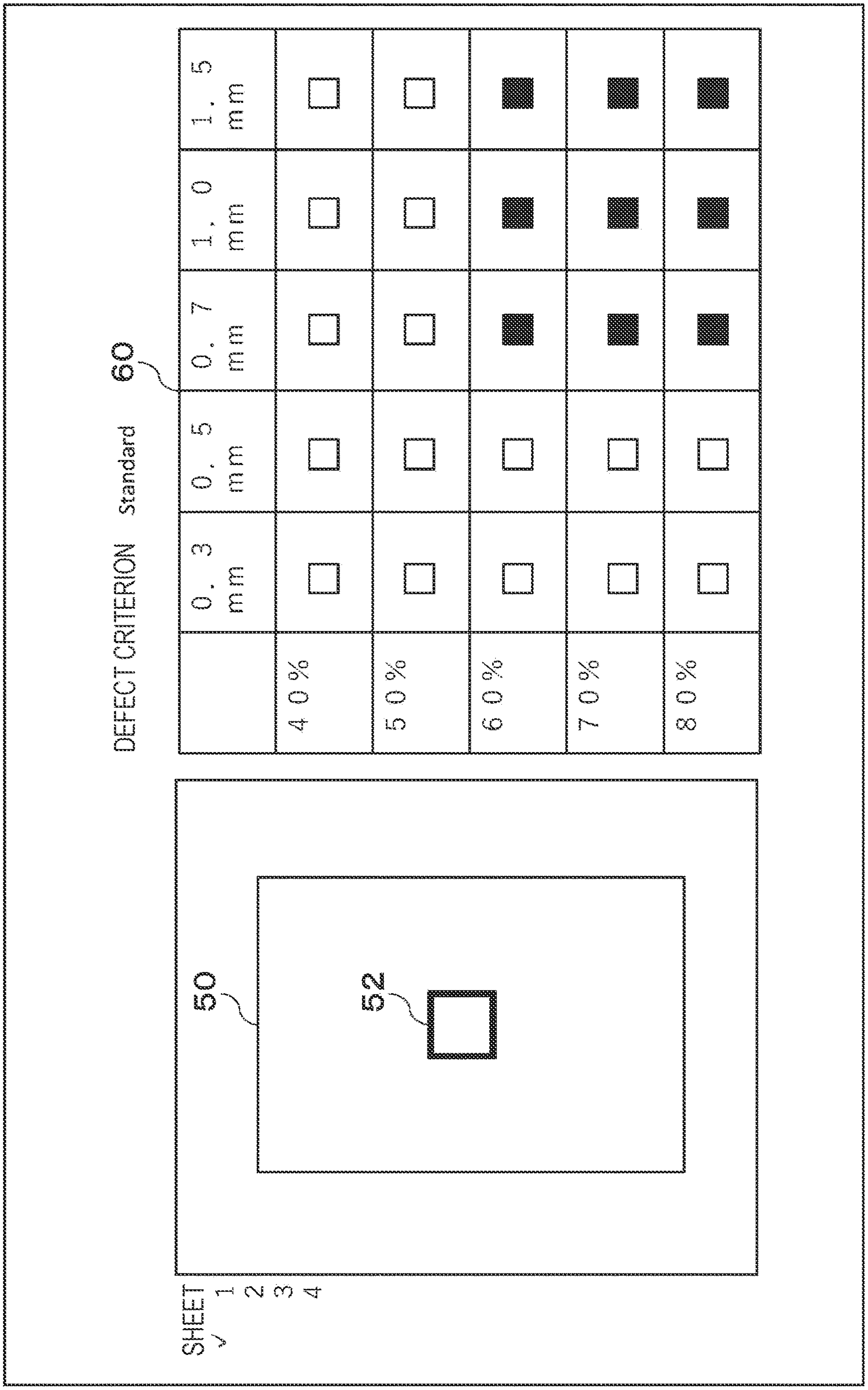
FIG. 6 is a first explanatory diagram illustrating a screen example of a scanned image, defects, and a two-dimensional matrix displayed on a display device according to an exemplary embodiment.

FIG. 6 schematically illustrates an example of a scanned image and a defect criterion that are displayed on the display device 12*f*.

In FIG. 6, a scanned image 50 is displayed on the left of the screen and a defect criterion 60 is displayed on the right of the screen. An acquired difference 52 is highlighted in such a manner that the difference 52 is displayed as a rectangular region superimposed on the scanned image 50. Furthermore, the defect criterion 60 is displayed as a two-dimensional matrix regarding color difference and size (hereinafter, the defect criterion 60 may also be referred to as a two-dimensional matrix 60). That is, threshold ranges of color difference: "40%≤color difference<50%", "50%≤color difference<60%", "60%≤color difference<70%", "70%≤color difference<80%", and "80%≤color difference", are displayed in rows of the two-dimensional matrix, and threshold ranges of size: "0.3 mm≤size<0.5 mm", "0.5 mm≤size<0.7 mm", "0.7 mm≤size<1.0 mm", "1.0 mm≤size<1.5 mm", and "1.5 mm≤size", are displayed in columns of the two-dimensional matrix. The two-dimensional matrix 60 in this exemplary embodiment functions as defect criterion display.

The defect criterion illustrated in FIG. 6 is set based on the Standard defect criterion setting file, and threshold ranges of color difference and size corresponding to the Standard defect criterion are highlighted in black in the two-dimensional matrix regarding combinations of color difference and size. In FIG. 6, threshold ranges "60%≤color difference" and "0.7 mm≤size" are displayed in black. Threshold ranges displayed in "black" represent "effective" threshold ranges. In contrast, threshold ranges displayed in "white" represent "ineffective" threshold ranges.

By viewing such a screen, the user is able to understand presence or absence of the difference 52 in the scanned image 50 and the position of the difference 52 if it is present. The user is also able to easily understand a threshold range of color difference and size corresponding to the difference 52. That is, the user is able to confirm on a single screen that the difference 52 is present at the position indicated as a rectangle in the scanned image 50 and that threshold ranges corresponding to the difference 52 are "60%≤color difference" and "0.7 mm≤size", that is, the differences in color difference and size between the scanned image and the reference image fall within the above-mentioned threshold ranges and are thus acquired as a defect.

Furthermore, when the user operates a user operation device such as a mouse to select the difference 52 on the screen, the CPU 12*b* detects the user operation and highlights in a more detailed manner the threshold range of color difference and size corresponding to the selected difference 52.

Figure 7:
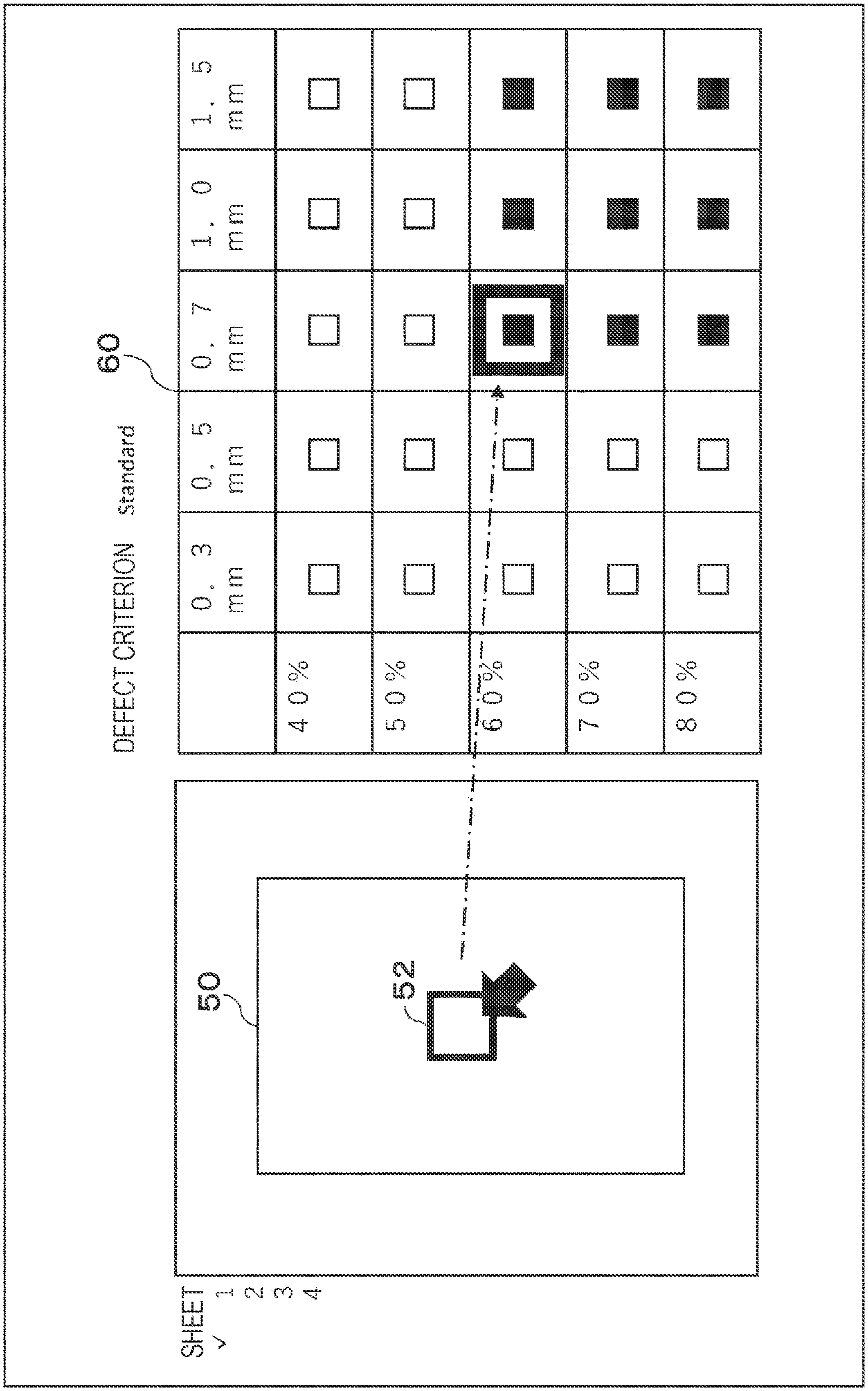
FIG. 7 is a second explanatory diagram illustrating a screen example of a scanned image, defects, and a two-dimensional matrix displayed on the display device according to an exemplary embodiment.

FIG. 7 illustrates a screen example of the case where the user operates a mouse to select the difference 52 on the screen illustrated in FIG. 6. When the user selects the difference 52 by superimposing a mouse pointer (indicated by a solid arrow in FIG. 7) on the rectangular region of the difference 52, the CPU 12*b* detects the user operation and highlights the threshold range corresponding to the selected difference 52. Specifically, a threshold range corresponding to the color difference and size of the selected difference 52 in the two-dimensional matrix regarding color difference and size is enclosed in a rectangular region and highlighted. In FIG. 7, the threshold range "60%≤color difference<70%" and "0.7 mm≤size<1.0 mm" corresponding to the selected difference 52 is highlighted as a rectangular region.

In FIG. 7, the threshold range corresponding to the difference 52 is indicated by a broken-line arrow. This arrow is provided to allow the user to easily understand that the threshold range corresponds to the difference 52 and is not necessarily displayed on the screen.

The screen example for the case where the user performs an operation for selecting the difference 52 in the scanned image 50 on the screen illustrated in FIG. 6 has been described above with reference to FIG. 7. In the case where the user performs an operation for selecting a threshold range in the two-dimensional matrix 60 on the screen illustrated in FIG. 6, the difference 52 corresponding to the selected threshold range may be highlighted in a similar manner.

Figure 8:
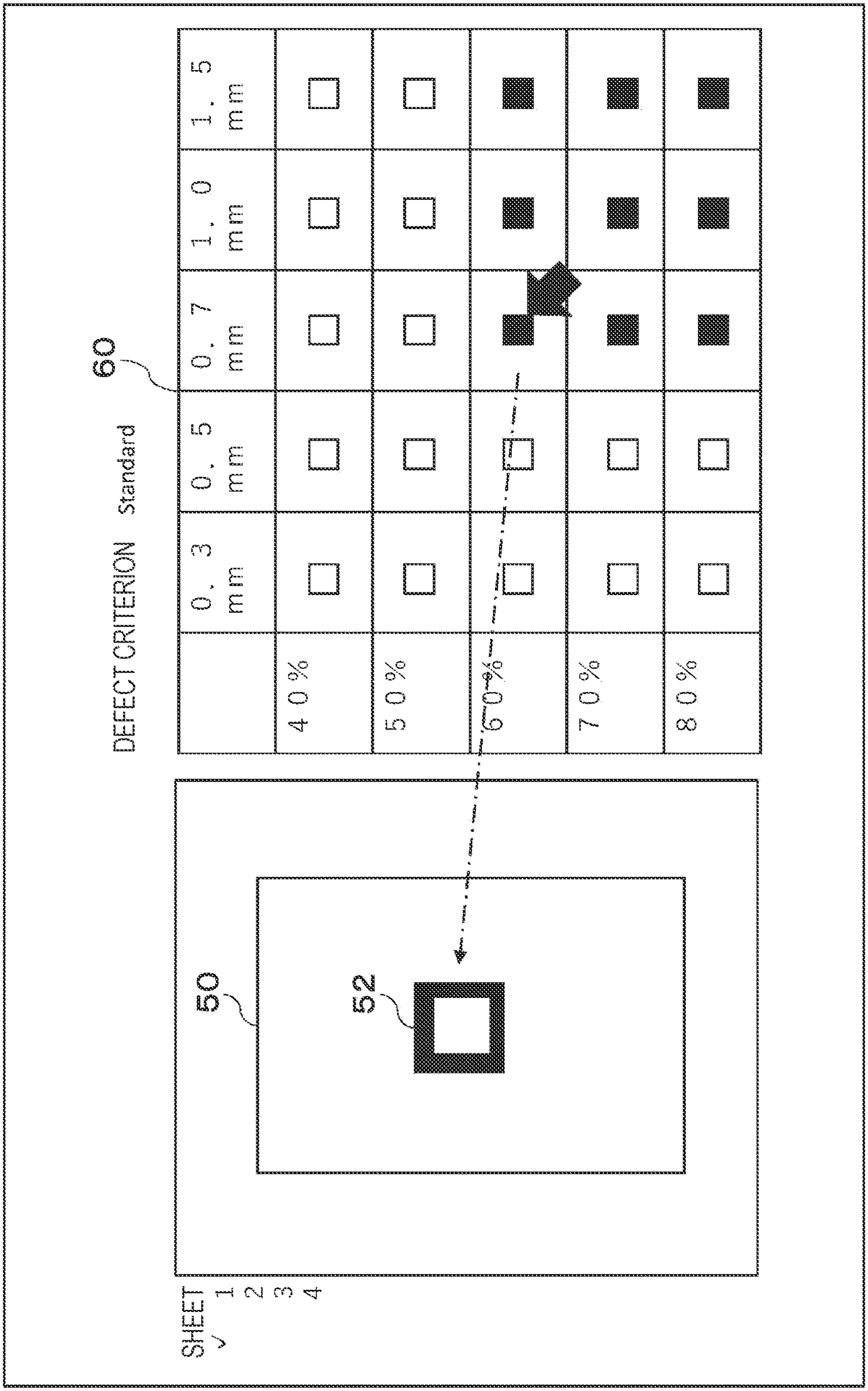
FIG. 8 is a third explanatory diagram illustrating a screen example of a scanned image, defects, and a two-dimensional matrix displayed on the display device according to an exemplary embodiment.

FIG. 8 illustrates a screen example for the case where the user operates the user operation device such as a mouse to select a specific threshold range in the two-dimensional matrix 60 on the screen illustrated in FIG. 6. When the user selects a specific threshold range by superimposing a mouse pointer (indicated by a solid arrow in FIG. 8) on one of the "effective" threshold ranges, which are displayed in black, in the two-dimensional matrix, the CPU 12*b* detects the user operation and highlights the difference 52 corresponding to the selected threshold range. Specifically, when the user selects the threshold range "60%≤color difference<70%" and "0.7 mm≤size<1.0 mm", the difference 52 corresponding to the selected threshold range, that is, the difference 52 having a color difference and a size within the selected threshold range, is highlighted.

In FIG. 8, only one difference 52 is highlighted as a defect corresponding to the threshold range selected by the user. However, in the case where there are a plurality of differences 52 corresponding to the threshold range selected by the user, all the corresponding differences 52 are highlighted.

Referring to FIGS. 7 and 8, when receiving a user operation for one of highlighting of the difference 52 and displaying of the two-dimensional matrix 60, that is, providing of defect criterion display, the CPU 12*b* changes the display mode of the other one of the highlighting of the difference 52 and the providing of the defect criterion display.

In contrast, in FIG. 8, there may be a case where the user visually recognizes the highlighted difference 52 and wants to exclude the difference 52 from targets, that is, the user wants to set the difference 52 as a non-defect. In this exemplary embodiment, in such a case, since both the difference 52 in the scanned image 50 and the two-dimensional matrix 60 are displayed on the screen, the user is able to easily make an adjustment.

Figure 9:
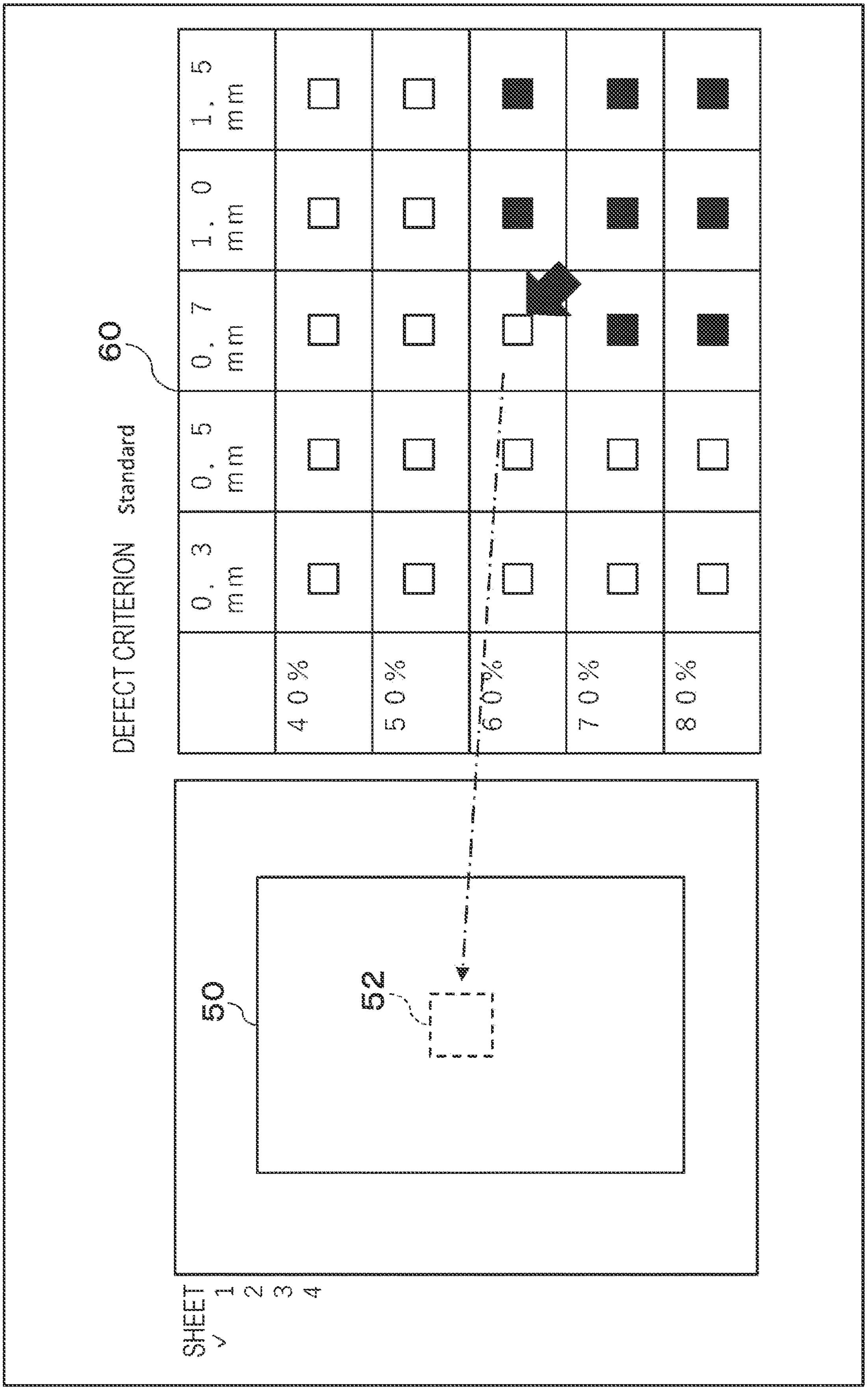
FIG. 9 is a fourth explanatory diagram illustrating a screen example of a scanned image, defects, and a two-dimensional matrix displayed on the display device according to an exemplary embodiment.

FIG. 9 illustrates an operation example for the case where the user wants to set the difference 52 as a non-defect on the screen illustrated in FIG. 8. The user operates the user operation device such as a mouse to select a desired black range from among "effective" threshold ranges, which are displayed in black, and changes the display from "black display" to "white display" (removes the tick in a box corresponding to the selected threshold range and changes the threshold range from "effective" to "ineffective"). The CPU 12*b* detects the user operation, and changes the display mode of the difference 52 corresponding to the excluded threshold range, for example, changes the display mode from "display" to "non-display". In FIG. 9, a non-display state of the difference 52 is indicated by a broken line.

In FIG. 9, the difference 52 that is regarded as a defect before the threshold range is adjusted but is not regarded as a defect after the threshold range is adjusted is changed from "display" to "non-display". However, the difference 52 that is regarded as a defect before the adjustment but is not regarded as a defect after the adjustment may be displayed relatively less noticeable than before the adjustment. For example, in FIG. 9, after the adjustment, the difference 52 may be displayed in gray, the line enclosing the rectangle indicating the difference 52 may be supplemented, or the difference 52 may be enclosed in a broken-line rectangle.

Furthermore, although the difference 52 that is regarded as a defect before the threshold range is adjusted but is not regarded as a defect after the threshold range is adjusted is changed from "display" to "non-display" in FIG. 9, the difference 52 that is regarded as a defect before the adjustment but is not regarded as a defect after the adjustment may be displayed in a color different from that before the adjustment. For example, in FIG. 9, the difference 52 is displayed in red before the adjustment and is displayed in yellow after the adjustment.

Figure 10:
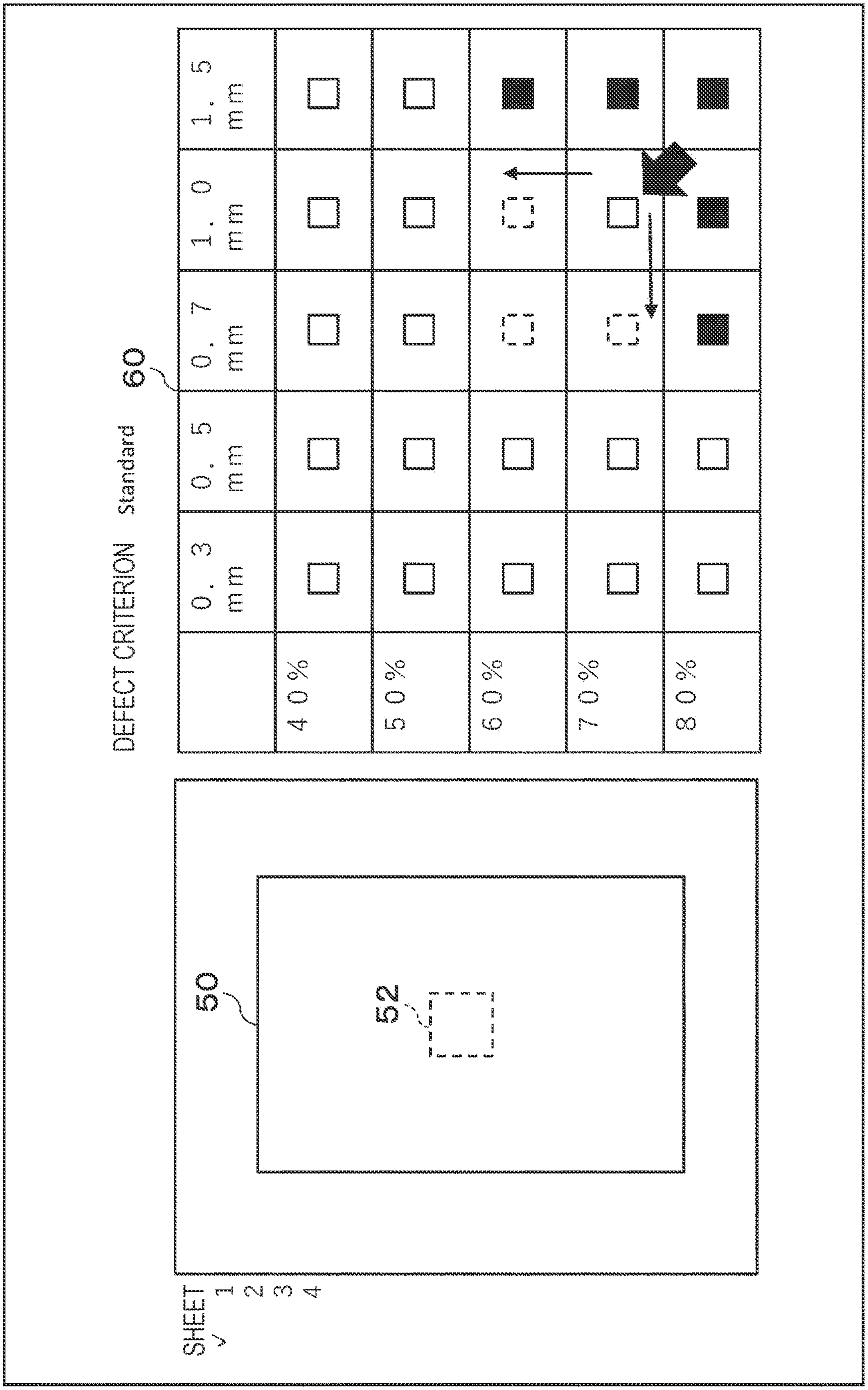
FIG. 10 is a fifth explanatory diagram illustrating a screen example of a scanned image, defects, and a two-dimensional matrix displayed on the display device according to an exemplary embodiment.

FIG. 10 illustrates another operation example for the case where the user wants to set the difference 52 as a non-defect on the screen illustrated in FIG. 8. The user operates the user operation device such as a mouse to select a desired one of threshold ranges displayed in black and changes the display from "black display" to "white display" (removes the tick). For example, the user selects the threshold range "70%≤color difference<80%" and "1.0 mm≤size<1.5 mm" and changes the display from "black display" to "white display" (removes the tick). When detecting the user operation, the CPU 12*b* automatically changes display of threshold ranges with values relatively smaller than the value of the selected threshold range among the threshold ranges displayed in black (that is, a strict condition is applied), as well as the selected threshold range, from "black display" to "white display", and changes the threshold ranges from "effective" to "ineffective". Specifically, in the case where the defect criterion before the operation is "60%≤color difference" and "0.7≤size" as illustrated in FIG. 6 and a selected threshold range is "70%≤color difference<80%" and "1.0 mm≤size<1.5 mm", a threshold range "60%≤color difference<70%" and "0.7 mm≤size<1.0 mm", a threshold range "60%≤color difference<70%" and "1.0 mm≤size<1.5 mm", and a threshold range "70%≤color difference<80%" and "0.7 mm≤size<1.0 mm", as well as the selected threshold range, are automatically changed from "black display" to "white display" (the tick is removed). Then, the difference 52 corresponding to the threshold ranges changed from "black display" to "white display" is changed from "display" to "non-display". Thus, although not illustrated in FIG. 10, if there is a defect corresponding to a threshold range "60%≤color difference<70%" and "0.7 mm≤size<1.0 mm", the defect is changed from "display" to "non-display" as with the difference 52 in accordance with a selection operation by the user.

For example, to change a defect criterion in accordance with an operation for a defect, display of the defect criterion may be changed from "black display" to "white display" by an operation such as (a) superimposing the pointer of a mouse on a defect and left-clicking the mouse or (b) superimposing the pointer of a mouse on a defect and right-clicking the mouse so that a pop-up is displayed, and then selecting "determined not to be a defect" from a pop-up menu.

Next, a screen example for the case where, in particular, the method A, that is, a method for detecting all the detectable differences in advance, is used will be described.

Figure 11:
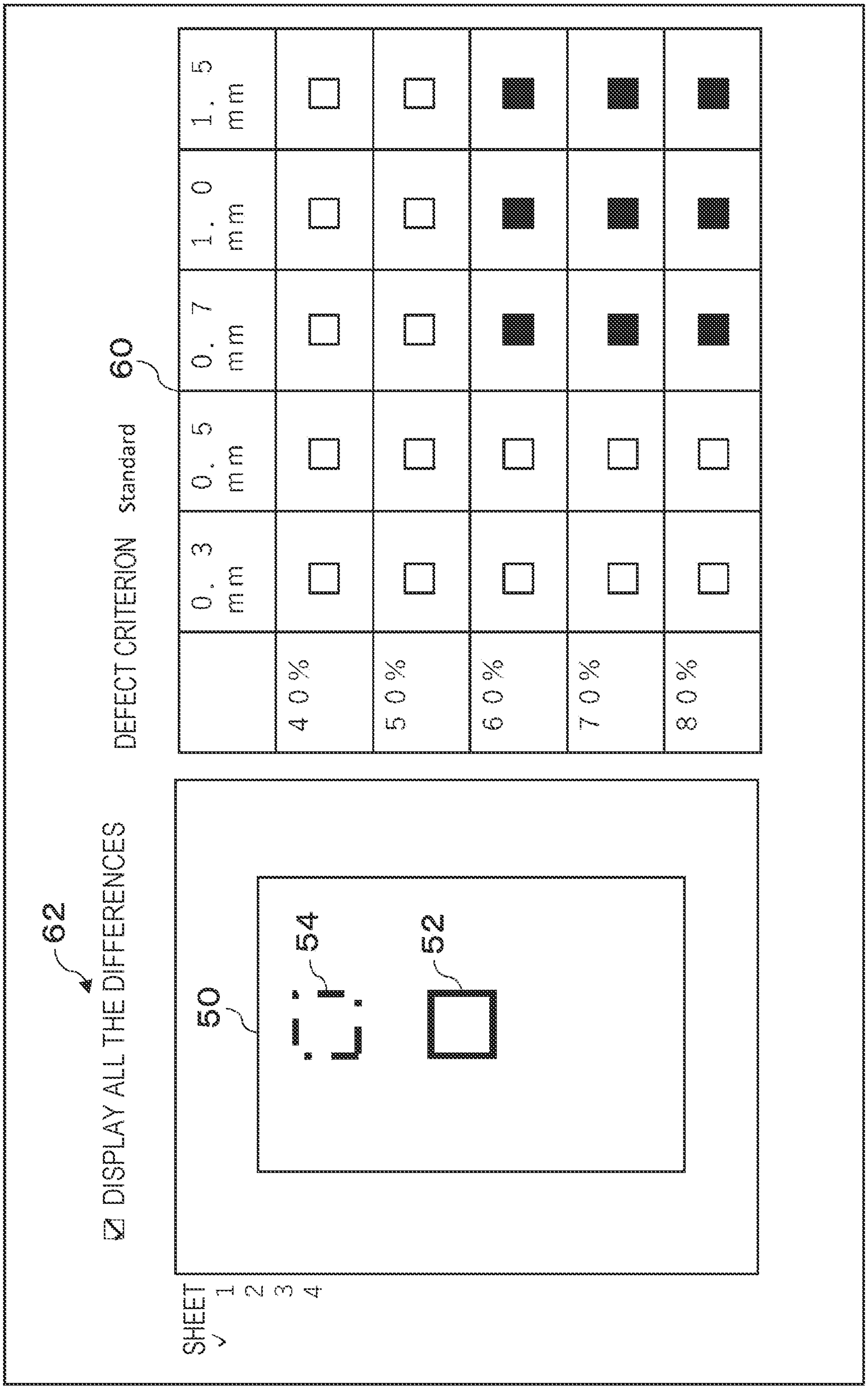
FIG. 11 is a sixth explanatory diagram illustrating a screen example of a scanned image, defects, and a two-dimensional matrix displayed on the display device according to an exemplary embodiment.

FIG. 11 illustrates a screen example for the case where the user wants to display all the differences when the method for detecting in advance all the detectable differences is used. A selection menu 62 for selecting whether or not to display all the differences is displayed at a predetermined position on the screen, for example, above the scanned image 50. When the user ticks the selection menu 62 to select "display all the differences", the CPU 12*b* detects all the detectable differences between the scanned image 50 and the reference image, acquires only a difference corresponding to the set defect criterion among all the detected differences, and displays the difference corresponding to the set defect criterion and the other detected differences in different display modes.

In FIG. 11, the CPU 12*b* displays all the detected differences as a difference 54 represented by a rectangular region enclosed in a dot-and-dash line and displays a difference corresponding to the set defect criterion as the difference 52 represented by a rectangular region enclosed in a solid line. Obviously, all the differences may be displayed in a certain color (for example, green), and the difference 52 corresponding to the set defect criterion may be displayed in a different color (for example, red). Since the difference 54 is not regarded as a defect according to the set defect criterion, the CPU 12*b* highlights the difference 52 that is regarded as a defect according to the defect criterion and the difference 54 that is not regarded as a defect according to the defect criterion in different display modes.

Furthermore, as in the screen example illustrated in FIG. 6, in addition to the scanned image 50, the difference 52, and the difference 54, the two-dimensional matrix 60 regarding color difference and size is also displayed. In the two-dimensional matrix 60, the difference 52 represents a defect corresponding to threshold ranges displayed in black, and the difference 54 represents a defect corresponding to threshold ranges displayed in white.

Figure 12:
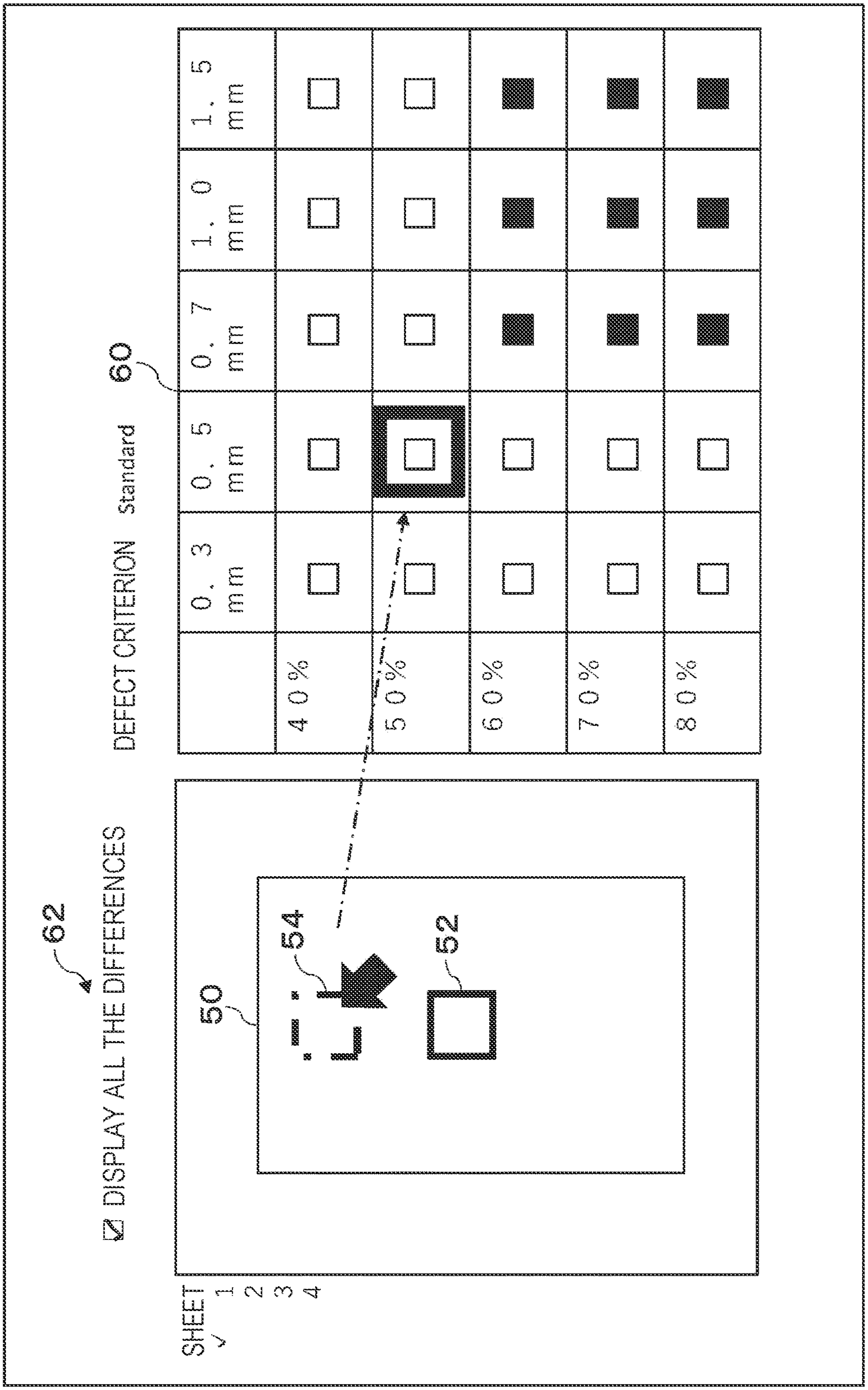
FIG. 12 is a seventh explanatory diagram illustrating a screen example of a scanned image, defects, and a two-dimensional matrix displayed on the display device according to an exemplary embodiment.

FIG. 12 illustrates a screen example for the case where the user operates the mouse to select the difference 54 on the screen illustrated in FIG. 11. When the user superimposes the mouse pointer onto the rectangular region enclosed in dot-and-dash line representing the difference 54 to select the difference 54, the CPU 12*b* detects the user operation and highlights a threshold range corresponding to the selected difference 54. Specifically, in the two-dimensional matrix 60 regarding color difference and size, the threshold range corresponding to the selected difference 54 is highlighted in such a manner that the threshold range is enclosed in a rectangular region. In FIG. 12, the threshold range "50%≤color difference<60%" and "0.5 mm≤size<0.7 mm" is highlighted. This threshold range is different from threshold ranges representing a defect criterion (regions displayed in black in FIG. 12).

Figure 13:
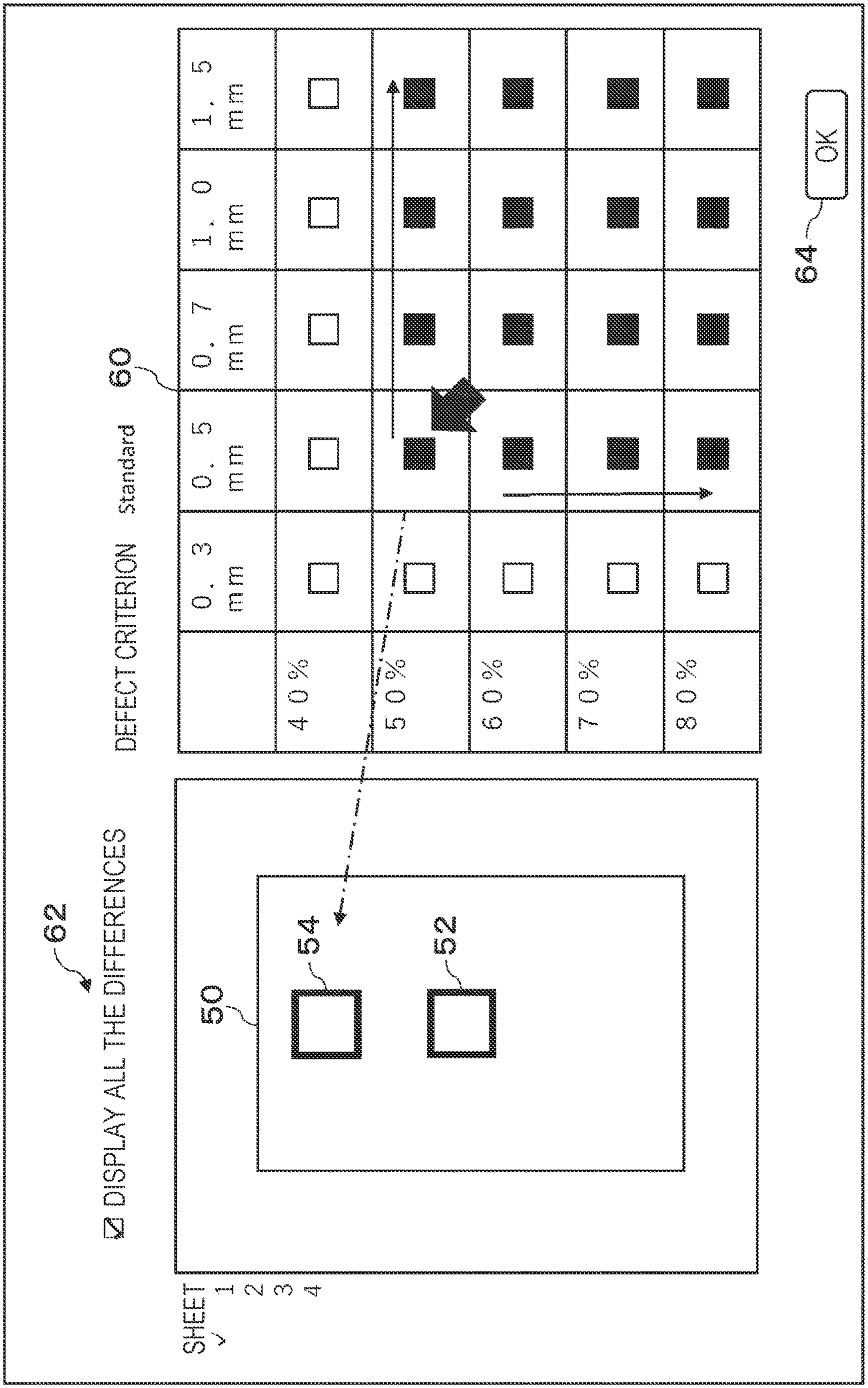
FIG. 13 is an eighth explanatory diagram illustrating a screen example of a scanned image, defects, and a two-dimensional matrix displayed on the display device according to an exemplary embodiment.

FIG. 13 illustrates a screen example for the case where the user visually recognizes the difference 54 indicated by a dot-and-dash line on the screen illustrated in FIG. 12 and determines that the difference 54 is to be regarded as a defect. For example, when the user right-clicks the mouse, the CPU 12*b* detects the right-click operation and displays a pop-up setting menu regarding whether or not to regard a difference as a defect based on the defect criterion. When the user performs an operation for regarding the difference as a defect based on the defect criterion, the CPU 12*b* detects the operation, and changes display of the selected difference 54 from display using a dot-and-dash line to highlighting using a solid line (alternatively, from display in green to display in red) in accordance with the operation. At the same time, the CPU 12*b* defines the threshold range corresponding to the difference 54 as a threshold range based on the defect criterion by changing display of the threshold range from white display to black display (in accordance with this operation, the difference 54 becomes regarded as a defect 54). At this time, the CPU 12*b* adds not only the threshold range "50%≤color difference<60%" and "0.5 mm≤size<0.7 mm" corresponding to the selected difference 54 but also threshold ranges with values larger than the value of the selected threshold range 54 (that is, a milder condition is applied) as threshold ranges of the defect criterion by displaying the threshold ranges with the larger values in black and defining the threshold ranges as being "effective". That is, in addition to the threshold range "50%≤color difference<60%" and "0.5 mm≤size<0.7 mm" corresponding to the selected difference 54, the range "60%≤color difference<70%" and "0.5 mm≤size<0.7 mm", the range "70%≤color difference<80%" and "0.5 mm≤size<0.7 mm", the range "80%≤color difference" and "0.5 mm≤size<0.7 mm", the range "50%≤color difference<60%" and "0.7 mm≤size<1.0 mm", the range "50%≤color difference<60%" and "1.0 mm≤size<1.5 mm", and the range "50%≤color difference<60%" and "1.5 mm≤size" are also regarded as "effective" and defined as threshold ranges of the defect criterion.

On the screen illustrated in FIG. 13, the threshold ranges are adjusted while viewing the difference 54. The defect criterion indicated by the adjusted two-dimensional matrix is stored into the memory when the user operates the mouse or the like to select an "OK" button 64 on the lower right of the screen. The CPU 12*b* overwrites the threshold ranges illustrated in FIG. 11 with the adjusted threshold ranges illustrated in FIG. 13 as threshold ranges corresponding to the Standard defect criterion setting file set for a job to be processed and stores the adjusted threshold ranges into the memory. Alternatively, the defect criterion indicated by the adjusted two-dimensional matrix may be stored as a new defect criterion setting file into the memory. The stored adjusted threshold ranges are basically applied to all the pages for the same job.

In the processing described above, basically, a single defect criterion is assigned to all the pages of a job, and defects are displayed by, for example, assigning the Standard defect criterion setting file to all the pages of a job. However, different defect criterion setting files may be applied to individual pages of a job. Specifically, for a certain job, the Standard defect criterion setting file may be applied to the first page, the High defect criterion setting file may be applied to the second page, the High defect criterion setting file may be applied to the third page, the Standard defect criterion setting file may be applied to the fourth page, and so on.

Figure 14:
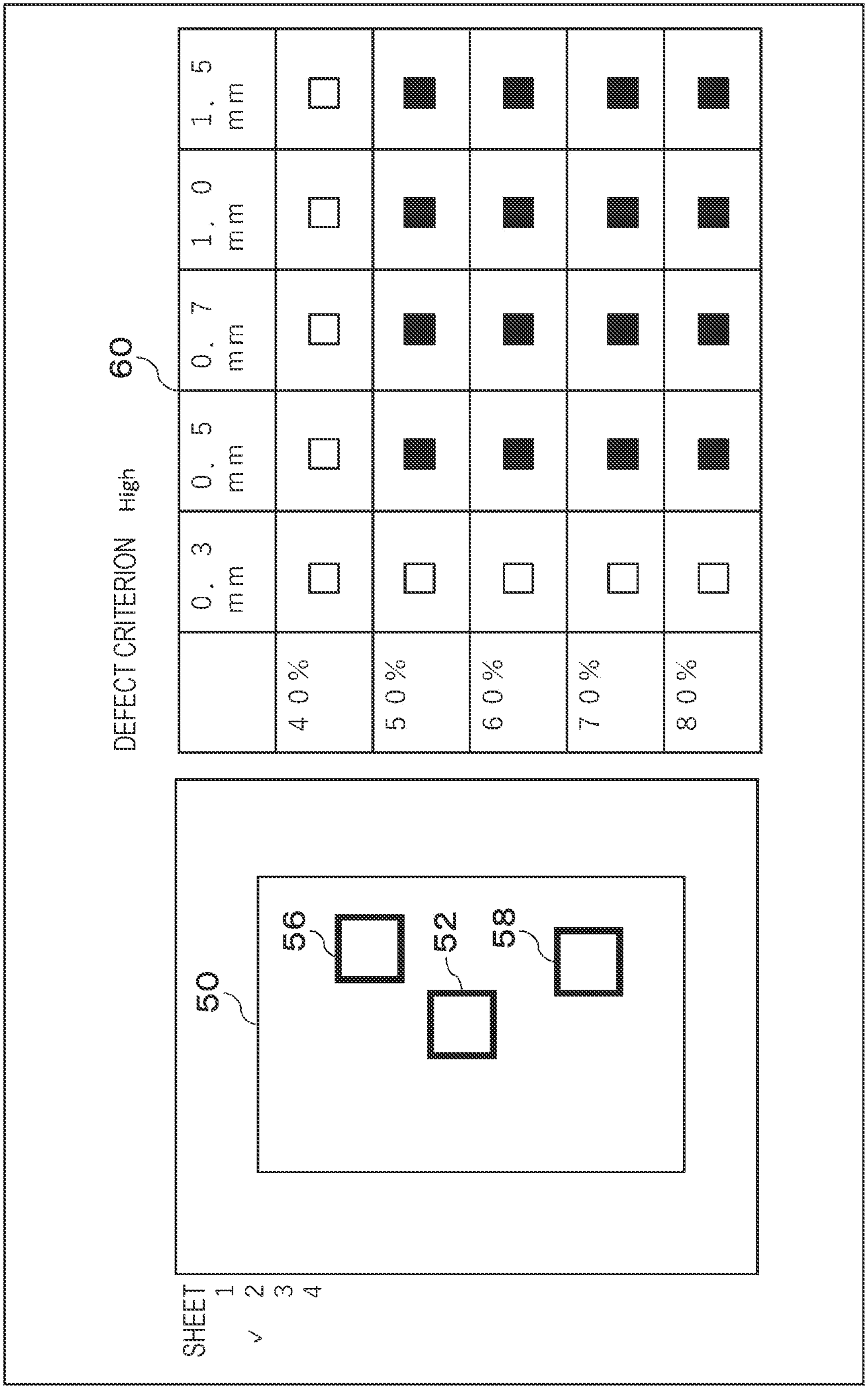
FIG. 14 is a ninth explanatory diagram illustrating a screen example of a scanned image, defects, and a two-dimensional matrix displayed on the display device according to an exemplary embodiment.

FIG. 14 illustrates a screen example for the case where different defect criterion setting files are applied for individual pages. In this case, the Standard defect criterion setting file is applied to the first page, and the High defect criterion setting file is applied to the second page. As illustrated in FIG. 14, the High defect criterion setting file is set for the second page, and differences 52, 56, and 58 and the two-dimensional matrix 60 corresponding to the High defect criterion setting file are displayed on the left and right of the screen, respectively. In the two-dimensional matrix 60 for the High defect criterion setting file, ranges displayed in black, that is, "effective" threshold ranges, are larger than those in the two-dimensional matrix for the Standard defect criterion setting file. In the case where a threshold range of a certain defect criterion setting file is adjusted by the user in accordance with data of a job indicating which defect criterion is applied to which page, the CPU 12*b* applies the adjustment only to a page corresponding to the adjusted defect criterion setting file. That is, as illustrated in FIG. 13, in the case where a threshold range of the Standard defect criterion setting file is adjusted, the adjustment is applied only to the fourth page to which the Standard defect criterion setting file is applied, and the adjustment is not applied to neither the second page nor the third page to which a different defect criterion setting file is applied.

Next, a flowchart of a process according to an exemplary embodiment will be described.

Figure 15:
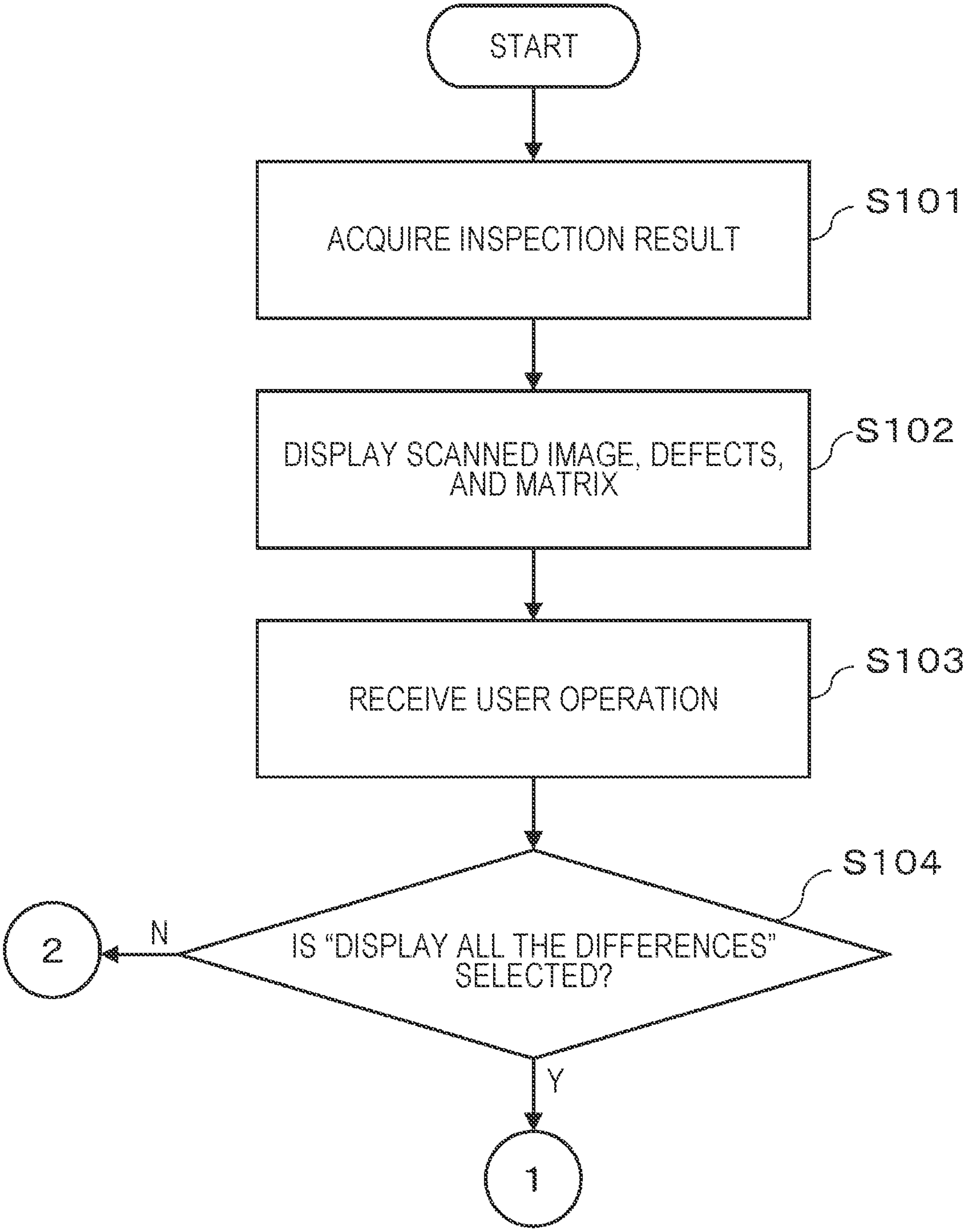
FIG. 15 is a first flowchart of a process in an exemplary embodiment.
Figure 16A:
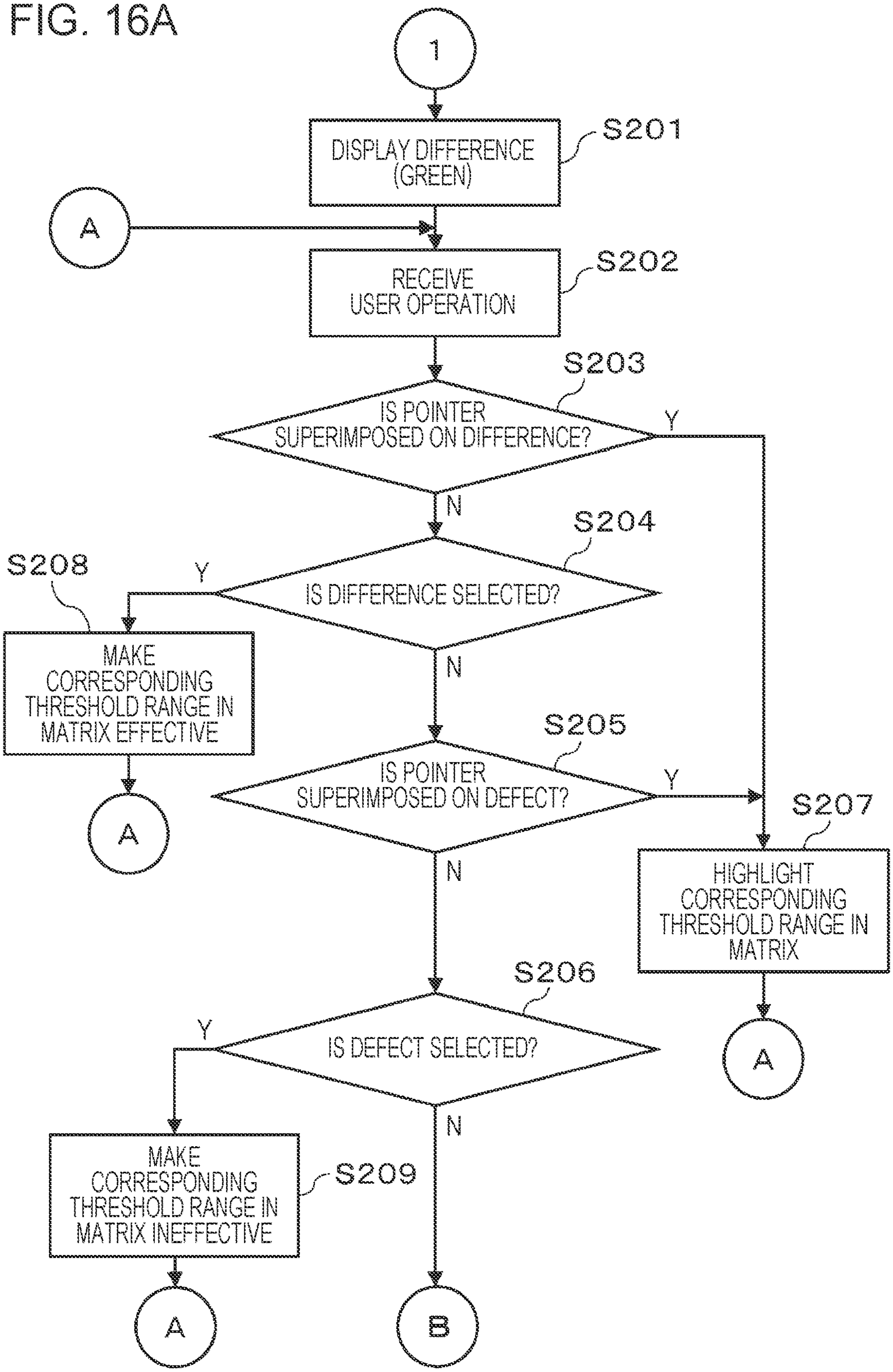
FIG. 16A is a second flowchart of the process in an exemplary embodiment.
Figure 16B:
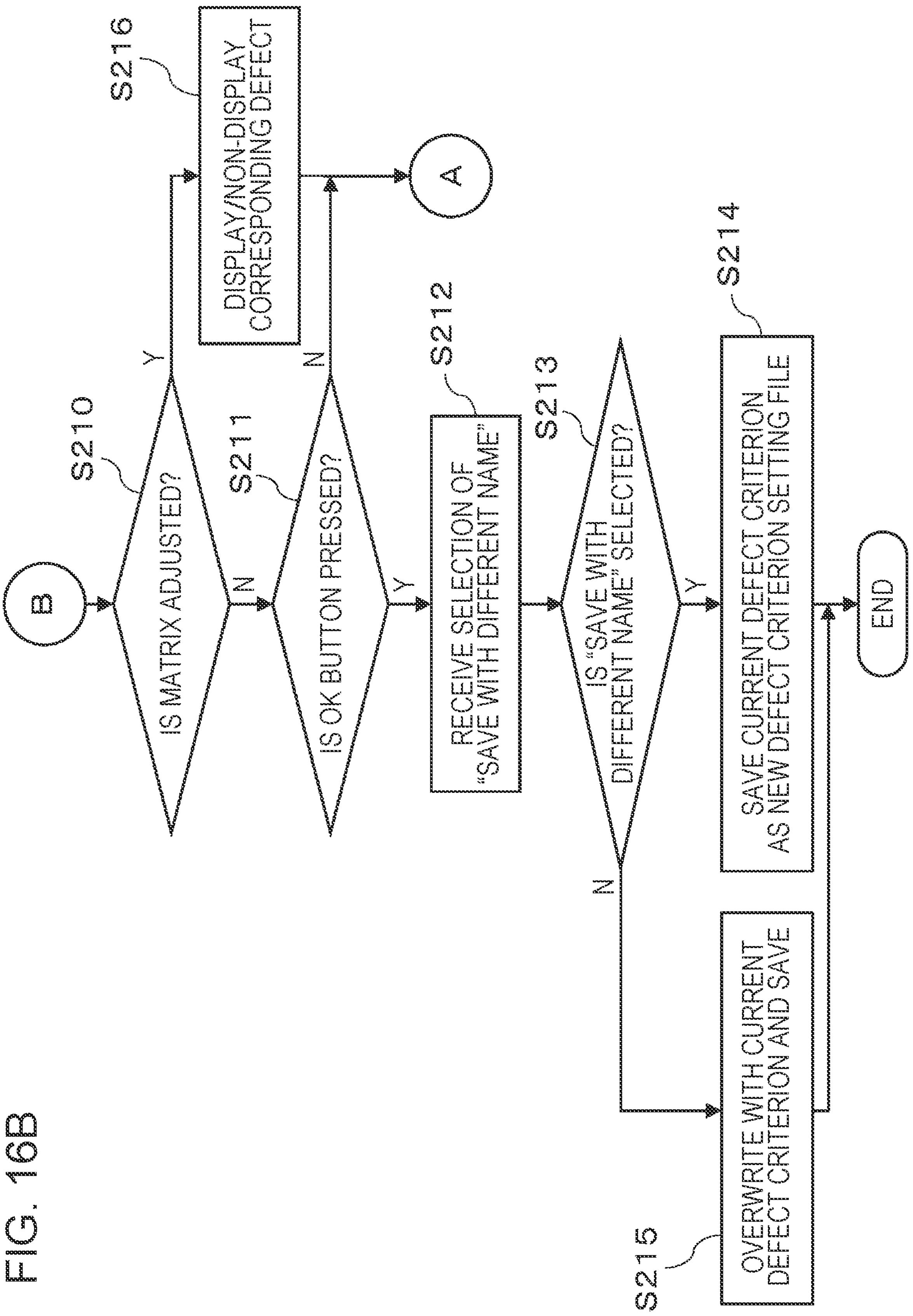
FIG. 16B is a third flowchart of the process in an exemplary embodiment.
Figure 16C:
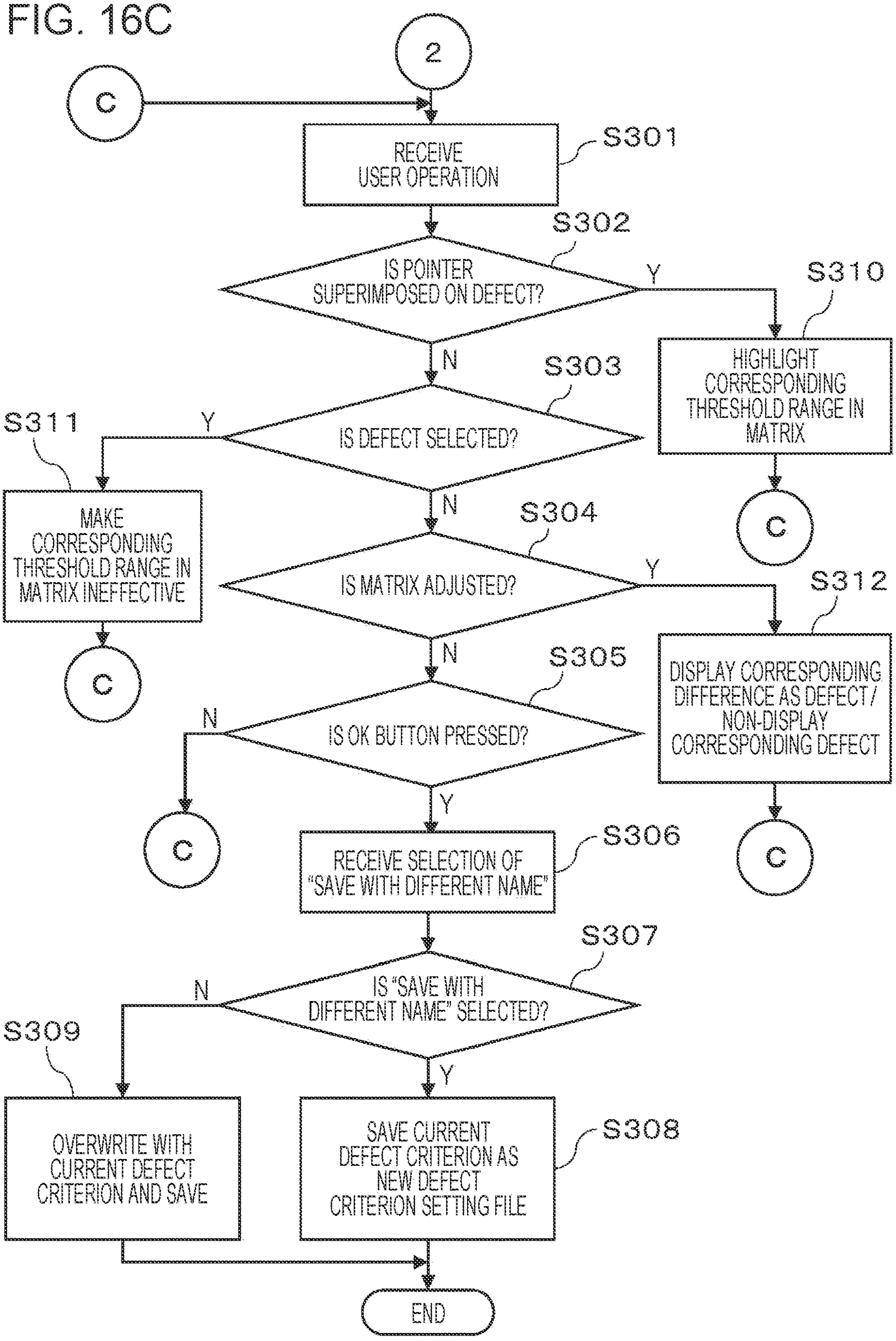
FIG. 16C is a fourth flowchart of the process in an exemplary embodiment.

FIG. 15 and FIGS. 16A and 16C are flowcharts of a process corresponding to the screen examples illustrated in FIGS. 6 to 10 for the case where a threshold range of a defect criterion indicated by a two-dimensional matrix is adjusted.

Referring to FIG. 15, the CPU 12*b* acquires an inspection result (S101). For example, in the method A, the CPU 12*b* compares a scanned image with a reference image to detect differences between the scanned image and the reference image, and acquires a difference corresponding to a defect criterion from among the detected difference.

Next, the CPU 12*b* displays the acquired defect as a rectangular region superimposed on the scanned image. Furthermore, the CPU 12*b* displays, in addition to the scanned image and the defect, a two-dimensional matrix regarding color difference and size (see FIG. 6) (S102).

Next, the CPU 12*b* receives a user operation (S103), and determines whether or not an option "display all the differences" is selected from a menu displayed on a screen (S104). In the case where "display all the differences" is selected, the CPU 12*b* proceeds to processing illustrated in FIGS. 16A and 16B. In the case where "display all the differences" is not selected, the CPU 12*b* proceeds to processing illustrated in FIG. 16C.

In FIG. 16A, in accordance with selection of "display all the differences", the CPU 12*b* displays all the detected differences superimposed on the scanned image (S201). The CPU 12*b* displays all the differences in, for example, green. Furthermore, the CPU 12*b* displays a difference corresponding to the defect criterion among all the differences in red.

Next, the CPU 12*b* receives a user operation (S202), and determines whether or not the pointer of a mouse is superimposed on any one of the displayed differences (green) (S203). In the case where the pointer of the mouse is superimposed on any one of the displayed differences, the CPU 12*b* highlights a corresponding threshold range in the matrix (S207).

Next, the CPU 12*b* determines whether or not any one of the differences (green) is selected by the user (S204). In the case where the user has selected any one of the differences by, for example, clicking the mouse, the CPU 12*b* makes a corresponding threshold range effective by changing display of the corresponding threshold range from white display to black display in the matrix (S208).

Next, the CPU 12*b* determines whether or not the pointer of the mouse is superimposed on any one of the displayed defects (red) (S205). In the case where the pointer of the mouse is superimposed on any one of the displayed defects, the CPU 12*b* highlights a corresponding threshold range in the matrix (S207).

Next, the CPU 12*b* determines whether or not any one of the defects (red) is selected by the user (S206). In the case where the user has selected any one of the defects by, for example, clicking the mouse, the CPU 12*b* makes a corresponding threshold range ineffective by changing display of the corresponding threshold range from black display to white display in the matrix (S209).

In the case where no difference is selected and no defect is selected, the CPU 12*b* proceeds to processing illustrated in FIG. 16B. Furthermore, after performing the processing of steps S207, S208, and S209, the CPU 12*b* repeats processing of step S202 and subsequent steps again and receives a user operation.

Referring to FIG. 16B, the CPU 12*b* determines whether or not the matrix displayed along with the scanned image and the defects has been adjusted in accordance with a user operation (S210). In the case where the matrix has been adjusted, the CPU 12*b* displays or does not display a defect corresponding to the adjusted matrix (S216). That is, in the case where the adjustment of the matrix is a change from "ineffective" to "effective", display of a difference corresponding to the threshold range that has been made "effective" is changed from green to red so that the corresponding difference will be displayed as a new defect. In the case where the adjustment of the matrix is a change from "effective" to "ineffective", display of a defect corresponding to the threshold range that has been made "ineffective" is changed from red to green so that the corresponding defect will be displayed as a new difference (does not displayed as a defect).

Next, the CPU 12*b* determines whether or not the "OK" button displayed on the screen is pressed by the user (S211). In the case where the "OK" button is pressed, the CPU 12*b* further receives selection of a "save with a different name" option (S212). Then, the CPU 12*b* determines whether or not "save with a different name" is selected (S213). In the case where "save with a different name" is selected, the CPU 12*b* saves the current defect criterion, that is, the adjusted matrix, as a new defect criterion setting file (S214). In the case where "save with a different name" is not selected, the CPU 12*b* overwrites with the current defect criterion and saves the current defect criterion (S215). In contrast, after performing the processing of step S216 or in the case where the "OK" button is not pressed, the CPU 12*b* repeats the processing of step S202 and subsequent processing in FIG. 16A and receives a user operation.

In FIG. 16C, in accordance with non-selection of "display all the differences", the CPU 12*b* displays only a defect corresponding to the current defect criterion superimposed on the scanned image. The CPU 12*b* displays all the defects in, for example, red.

Next, the CPU 12*b* receives a user operation (S301), and determines whether or not the pointer of the mouse is superimposed on any one of the displayed defects (red) (S302). In the case where the pointer of the mouse is superimposed on any one of the displayed defects, the CPU 12*b* highlights a corresponding threshold range in the matrix (S310).

Next, the CPU 12*b* determines whether or not any one of the defects (red) is selected by the user (S303). In the case where the user has selected any one of the defects by, for example, clicking the mouse, the CPU 12*b* makes a corresponding threshold range ineffective by changing display of the corresponding threshold range from black display to white display in the matrix (S311).

Next, the CPU 12*b* determines whether or not the matrix that is displayed along with the scanned image and the defects has been adjusted in accordance with a user operation (S304). In the case where the matrix has been adjusted, the CPU 12*b* displays a defect corresponding to the adjusted matrix as a defect or does not display a corresponding defect (S312). That is, in the case where the adjustment of the matrix is a change from "ineffective" to "effective", a difference corresponding to the threshold range that has been made "effective" is displayed as a new defect. In the case where the adjustment of the matrix is a change from "effective" to "ineffective", a defect corresponding to the threshold range that has been made "ineffective" is not displayed.

Next, the CPU 12*b* determines whether or not the "OK" button displayed on the screen is pressed by the user (S305). In the case where the "OK" button is pressed, the CPU 12*b* further receives selection of a "save with a different name" option (S306). Then, the CPU 12*b* determines whether or not "save with a different name" is selected (S307). In the case where "save with a different name" is selected, the CPU 12*b* saves the current defect criterion, that is, the adjusted matrix, as a new defect criterion setting file (S308). In the case where "save with a different name" is not selected, the CPU 12*b* overwrites with the current defect criterion and saves the current defect criterion (S309). After performing the processing of steps S310, S311, and S312 or in the case where the "OK" button is not pressed, the CPU 12*b* repeats the processing of step S301 and subsequent processing and receives a user operation.

Figure 17:
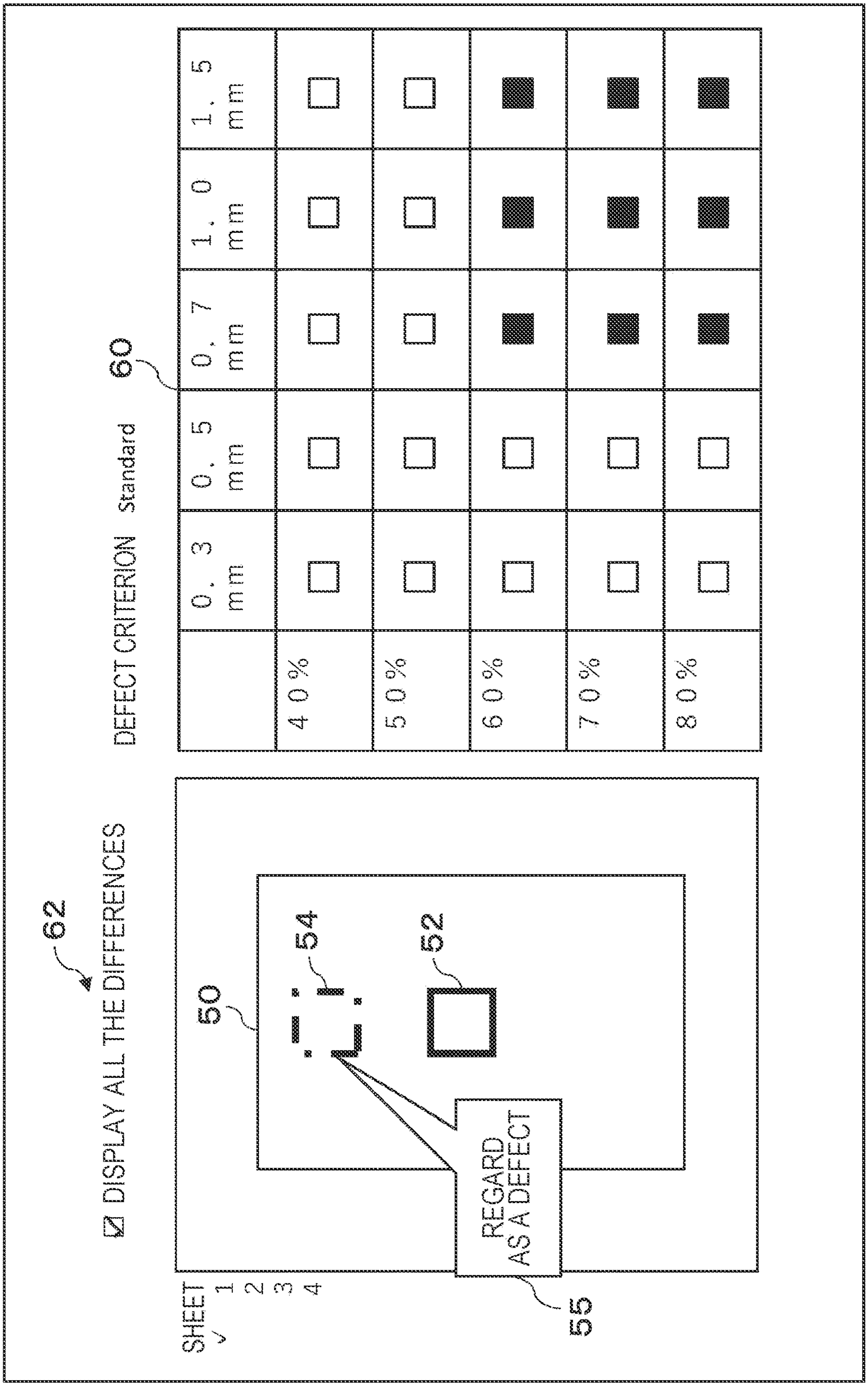
FIG. 17 is a tenth explanatory diagram illustrating a screen example of a scanned image, defects, and a two-dimensional matrix displayed on the display device according to an exemplary embodiment.

FIG. 17 illustrates a screen example of processing of steps S204 and S208 in FIG. 16A. In the case where any one of the differences 54 is selected (for example, by right-clicking the mouse), a pop-up menu 55 "regard as a defect" is displayed in association with the selected difference 54. When the user performs an operation for selecting the pop-up menu, the difference 54 is set as a new defect, and a threshold range corresponding to the difference 54 in the matrix becomes effective.

In this exemplary embodiment, in the case where a two-dimensional matrix representing a threshold range is adjusted in accordance with a user operation, overwriting with data of the adjusted two-dimensional matrix is performed in association with a corresponding job in accordance with a user operation. However, instead of overwriting, the adjusted two-dimensional matrix and data of an inspection result based on the adjusted two-dimensional matrix may be stored together with chronological information, apart from the two-dimensional matrix before the adjustment and data of an inspection result based on the two-dimensional matrix before the adjustment. Thus, the user is able to understand how the inspection result has been changed by the adjustment based on the user operation.

Furthermore, in the case where an inspection result is output in a PDF format or the like, a defect criterion, an inspection result based on the defect criterion, a change history, and the like may also be output using a comment function or the like.

Furthermore, in the case where a defect criterion is adjusted and an inspection result is also changed in accordance with the adjustment of the defect criterion, the CPU 12*b* notifies the print server 10 of the adjustment and the change.

In the case where there is no defect, the print server 10 processes an inspection target job as being normal and continues a printing operation. In the case where there is a defect, the print server 10 processes an inspection target job as an error. In error processing for the job in the case where there is a defect, the job is basically interrupted. The user may be able to set conditions for interruption, an operation to be performed after the interruption, and the like. For example, as conditions for interruption, the number of defective pages or the proportion of the number of defective pages in the total number of pages may be set. As an operation to be performed after the interruption, error processing or waiting for a user operation may be set. As offsetting at the time of occurrence of a defect, insertion of a recovery sheet or offsetting using a resumption sheet may be set. The CPU 12*b* supplies a control signal used for the case where there is a defect to the print server 10 in accordance with the conditions mentioned above. The print server 10 performs error processing under the above-mentioned conditions set by the user.

Exemplary embodiments of the present disclosure have been described above. However, the present disclosure is not limited to the above-mentioned exemplary embodiments and various modifications may be made.

First Modification

In an exemplary embodiment, a combination of color difference and size is used as a defect criterion and is displayed as a two-dimensional matrix on the display device 12*f*. However, a combination of color difference and size as a defect criterion is not necessarily displayed as a two-dimensional matrix.

Figure 18:
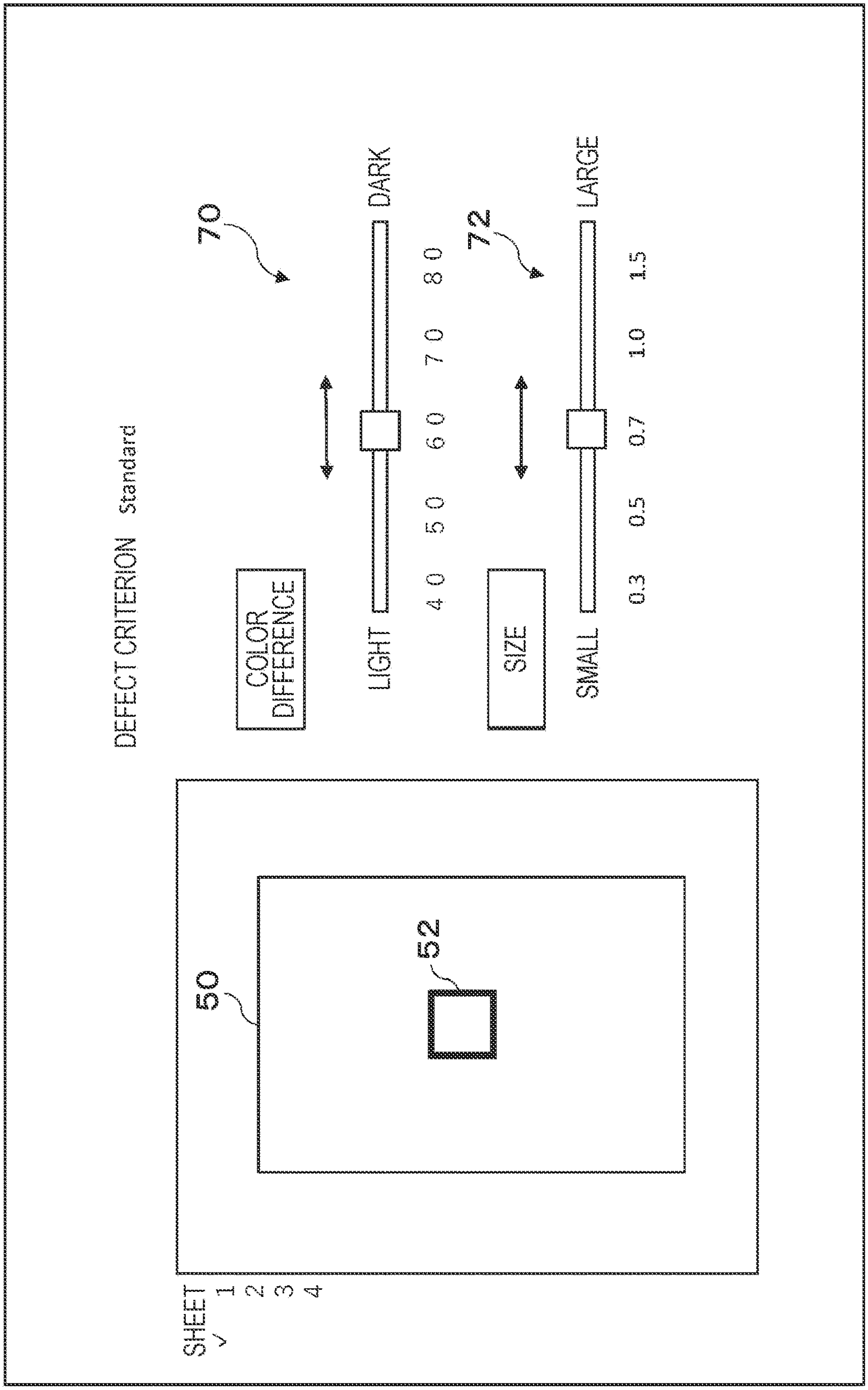
FIG. 18 is an explanatory diagram illustrating a screen example of a scanned image, defects, and sliders displayed on a display device according to a modification.

FIG. 18 illustrates a screen example for the case where each of a color difference and a size as a defect criterion is displayed in a one-dimensional manner in a slider format.

In FIG. 18, color difference is indicated on a slider 70 including a scale bar extending horizontally and a slider switch. A threshold range of color difference changes when the user operates the user operation device such as a mouse to horizontally move the slider switch. Similarly, size is indicated on a slider 72 including a scale bar extending horizontally and a slider switch. A threshold range of size changes when the user operates the user operation device such as a mouse to horizontally move the slider switch. A defect criterion is indicated at the positions of the slider switches of color difference and size. When the user selects a defect, a defect criterion corresponding to the selected defect is indicated as the positions of the slider switches of color difference and size. The user is able to adjust the threshold range of a defect criterion by horizontally moving the position of a displayed slider switch. In the first modification, the sliders 70 and 72 each function as defect criterion display.

In FIG. 18, the user may selectively display at least one of color difference and size. For example, in the case where the user wants to check and adjust a threshold range of color difference while size being substantially fixed, the CPU 12*b* may display only the slider 70 for color difference in accordance with a user operation. Similarly, in the case where the user wants to check and adjust a threshold range of size while color difference being substantially fixed, the CPU 12*b* may display only the slider 72 for size in accordance with a user operation.

Second Modification

In an exemplary embodiment, the CPU 12*b* may display a flag or a mark indicating failure for a page in which a defect is detected on the display device 12*f*. For example, in the screen example illustrated in FIG. 6, in the case where the difference 52 is displayed, an alert mark indicating that there is a failure in a corresponding page may be displayed in association with page display such as sheet 1, sheet 2, sheet 3, or the like displayed in a left end part of the screen.

Furthermore, in this case, as a result of adjustment of a threshold range as illustrated in FIG. 9, if presence or absence of a defect has been changed due to the adjustment of the threshold range, for example, if the difference 52 that is regarded as a defect before the adjustment is not regarded as a defect after the adjustment, an alert mark indicating that presence or absence of a defect has been changed due to the adjustment may be displayed in a corresponding page and notified to the user. In short, it is desirable that the fact that the defect criterion has been adjusted be displayed on the screen and notified to the user in units of pages in such a manner that the user is able to visually recognize the fact that the defect criterion has been adjusted.

Third Modification

In an exemplary embodiment, the scanned image 50 and the difference 52 are displayed on the left of the screen of the display device 12*f* and the two-dimensional matrix 60 is displayed on the right of the screen of the display device 12*f*. However, the scanned image 50 and the difference 52 may be displayed on the right of the screen and the two-dimensional matrix 60 may be displayed of the left of the screen. Alternatively, the scanned image 50, the difference 52, and the defect criterion 60 may be displayed vertically. Furthermore, when the user selects the difference 52 using the mouse or the like, a threshold range of the difference 52 may be displayed in a pop-up manner in accordance with the user operation.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

<<Appendix>>

<<<1>>>

A printed material inspection system comprising a display and a processor configured to: acquire, as a defect corresponding to a defect criterion, a difference that satisfies the defect criterion among differences between a scanned image obtained by scanning a printed material of an inspection target page among pages configuring a job and a reference image of the inspection target page; highlight the defect in the scanned image on the display and provide defect criterion display that is display for receiving setting for a defect criterion to be applied to the inspection target page on the display; and when a user operation for one of the highlighting of the defect and the providing of the defect criterion display is received, change a display mode of another one of the highlighting of the defect and the providing of the defect criterion display.

<<<2>>>

The printed material inspection system according to <<<1>>>, wherein the processor is configured to, when the defect displayed on the display is selected by a user, highlight a region corresponding to the defect criterion corresponding to the defect in the defect criterion display.

<<<3>>>

The printed material inspection system according to <<<1>>>, wherein the processor is configured to, when a region corresponding to the defect criterion in the defect criterion display is selected by a user, highlight the defect corresponding to the defect criterion.

<<<4>>>

The printed material inspection system according to any one of <<<1>>> to <<<3>>>, wherein the processor is configured to, when the defect criterion is changed by a user, highlight a difference that becomes regarded as a defect after the defect criterion is changed, among the differences.

<<<5>>>

The printed material inspection system according to any one of <<<1>>> to <<<3>>>, wherein the processor is configured to change a display mode of a difference that is regarded as a defect before the defect criterion is changed but is not regarded as a defect after the defect criterion is changed, among the differences.

<<<6>>>

The printed material inspection system according to <<<5>>>, wherein the processor is configured to display a difference that is regarded as a defect before the defect criterion is changed but is not regarded as a defect after the defect criterion is changed, among the differences, relatively less noticeable than before the defect criterion is changed.

<<<7>>>

The printed material inspection system according to <<<5>>>, wherein the processor is configured to highlight a difference that is regarded as a defect before the defect criterion is changed but is not regarded as a defect after the defect criterion is changed, among the differences, in a color different from a color used before the defect criterion is changed.

<<<8>>>

The printed material inspection system according to any one of <<<1>>> to <<<7>>>, wherein the processor is configured to highlight a difference that is regarded as a defect according to the defect criterion and a difference that is not regarded as a defect according to the defect criterion in different modes.

<<<9>>>

The printed material inspection system according to any one of <<<1>>> to <<<8>>>, wherein the processor is configured to be capable of performing setting in such a manner that a defect criterion for the inspection target page is applied to a page different from the inspection target page among the pages configuring the job.

<<<10>>>

The printed material inspection system according to <<<9>>>, wherein the processor is configured to, in a case where the defect criterion is changed, notify a user of a page in which a difference that is regarded as a defect is changed.

<<<11>>>

The printed material inspection system according to any one of <<<1>>> to <<<10>>>, wherein the defect criterion is a threshold for at least one of color difference, size, and shape of the difference.

<<<12>>>

The printed material inspection system according to any one of <<<1>>> to <<<11>>>, wherein the defect criterion is a threshold for color difference and size of the difference, and wherein the processor is configured to provide the defect criterion display as a two-dimensional matrix regarding the color difference and the size.

<<<13>>>

A program causing a computer to execute a process comprising: acquiring, as a defect corresponding to a defect criterion, a difference that satisfies the defect criterion among differences between a scanned image obtained by scanning a printed material of an inspection target page among pages configuring a job and a reference image of the inspection target page; highlighting the defect in the scanned image on a display and providing defect criterion display that is display for receiving setting for a defect criterion to be applied to the inspection target page on the display; and when a user operation for one of the highlighting of the defect and the providing of the defect criterion display is received, changing a display mode of another one of the highlighting of the defect and the providing of the defect criterion display.

What is claimed is:

1. A printed material inspection system comprising:

a display; and a processor configured to:

acquire, as a defect corresponding to a defect criterion, a difference that satisfies the defect criterion among differences between a scanned image obtained by scanning a printed material of an inspection target page among pages configuring a job and a reference image of the inspection target page;

display on the display, a screen including the scanned image and a defect criterion display, the defect criterion display being a display of receiving setting for a defect criterion to be applied to the scanned image;

highlight the defect in the scanned image in the screen, the highlighted defect corresponding to the defect criterion to be applied to the scanned image;

when a user operation for the highlighting of the defect is received, change the display of the defect criterion display; and when a user operation for the defect criterion display is received, change the display of the highlighting of the defect.

2. The printed material inspection system according to claim 1, wherein the processor is configured to, when the defect displayed on the display is selected by a user, highlight a region corresponding to the defect criterion corresponding to the defect in the defect criterion display.

3. The printed material inspection system according to claim 2, wherein the defect criterion is a threshold for at least one of color difference, size, and shape of the difference.

4. The printed material inspection system according to claim 1, wherein the processor is configured to, when a region corresponding to the defect criterion in the defect criterion display is selected by a user, highlight the defect corresponding to the defect criterion.

5. The printed material inspection system according to claim 4, wherein the defect criterion is a threshold for at least one of color difference, size, and shape of the difference.

6. The printed material inspection system according to claim 1, wherein the processor is configured to, when the defect criterion is changed by a user, highlight a difference that becomes regarded as a defect after the defect criterion is changed, among the differences.

7. The printed material inspection system according to claim 6, wherein the defect criterion is a threshold for at least one of color difference, size, and shape of the difference.

8. The printed material inspection system according to claim 1, wherein the processor is configured to change a display mode of a difference that is regarded as a defect before the defect criterion is changed but is not regarded as a defect after the defect criterion is changed, among the differences.

9. The printed material inspection system according to claim 8, wherein the processor is configured to display a difference that is regarded as a defect before the defect criterion is changed but is not regarded as a defect after the defect criterion is changed, among the differences, relatively less noticeable than before the defect criterion is changed.

10. The printed material inspection system according to claim 8, wherein the defect criterion is a threshold for at least one of color difference, size, and shape of the difference.

11. The printed material inspection system according to claim 9, wherein the defect criterion is a threshold for at least one of color difference, size, and shape of the difference.

12. The printed material inspection system according to claim 8, wherein the processor is configured to highlight a difference that is regarded as a defect before the defect criterion is changed but is not regarded as a defect after the defect criterion is changed, among the differences, in a color different from a color used before the defect criterion is changed.

13. The printed material inspection system according to claim 12, wherein the defect criterion is a threshold for at least one of color difference, size, and shape of the difference.

14. The printed material inspection system according to claim 1, wherein the processor is configured to highlight a difference that is regarded as a defect according to the defect criterion and a difference that is not regarded as a defect according to the defect criterion in different modes.

15. The printed material inspection system according to claim 14, wherein the defect criterion is a threshold for at least one of color difference, size, and shape of the difference.

16. The printed material inspection system according to claim 1, wherein the processor is configured to be capable of performing setting in such a manner that a defect criterion for the inspection target page is applied to a page different from the inspection target page among the pages configuring the job.

17. The printed material inspection system according to claim 16, wherein the processor is configured to, in a case where the defect criterion is changed, notify a user of a page in which a difference that is regarded as a defect is changed.

18. The printed material inspection system according to claim 1, wherein the defect criterion is a threshold for at least one of color difference, size, and shape of the difference.

19. The printed material inspection system according to claim 18, wherein the defect criterion is a threshold for color difference and size of the difference, and wherein the processor is configured to provide the defect criterion display as a two-dimensional matrix regarding the color difference and the size.

20. A non-transitory computer readable medium storing a program causing a computer to execute a process comprising:

acquiring, as a defect corresponding to a defect criterion, a difference that satisfies the defect criterion among differences between a scanned image obtained by scanning a printed material of an inspection target page among pages configuring a job and a reference image of the inspection target page;

displaying on a display a screen including the scanned image and a defect criterion display, the defect criterion display being a display of receiving setting for a defect criterion to be applied to the scanned image;

highlighting the defect in the scanned image in the screen the highlighted defect corresponding to the defect criterion to be applied to the scanned;

when a user operation for the highlighting of the defect is received, changing the display of the defect criterion display, and when a user operation for the defect criterion display is received, changing the display of the highlighting of the defect.

* * * * *